(12) United States Patent
Wang et al.

(10) Patent No.: US 12,546,892 B2
(45) Date of Patent: Feb. 10, 2026

(54) LASER RADAR AND LASER RADAR DETECTION METHOD

(71) Applicant: Shenzhen Yinwang Intelligent Technologies Co., Ltd., Shenzhen (CN)

(72) Inventors: Zhenwei Wang, Shenzhen (CN); Li Zeng, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 1086 days.

(21) Appl. No.: 17/557,381

(22) Filed: Dec. 21, 2021

(65) Prior Publication Data

US 2022/0113417 A1    Apr. 14, 2022

Related U.S. Application Data

(63) Continuation of application No. PCT/CN2020/095952, filed on Jun. 12, 2020.

(30) Foreign Application Priority Data

Jun. 26, 2019    (CN) .......................... 201910561295.2

(51) Int. Cl.
*G01S 17/42* (2006.01)
*G01S 7/4911* (2020.01)
(Continued)

(52) U.S. Cl.
CPC ............. *G01S 17/42* (2013.01); *G01S 7/4911* (2013.01); *G01S 7/4914* (2013.01); *G01S 7/4917* (2013.01)

(58) Field of Classification Search
CPC ...... G01S 17/42; G01S 7/4917; G01S 7/4914; G01S 7/4911; G01S 17/34; G01S 7/4817;
(Continued)

(56) References Cited

U.S. PATENT DOCUMENTS

| RE46,672 E | 1/2018 | Hall |
| 10,036,812 B2 | 7/2018 | Crouch et al. |

(Continued)

FOREIGN PATENT DOCUMENTS

| CN | 107250723 A | 10/2017 |
| CN | 108267746 A | 7/2018 |

(Continued)

*Primary Examiner* — Daniel L Murphy
(74) *Attorney, Agent, or Firm* — Leydig, Voit & Mayer, Ltd.

(57) ABSTRACT

A laser radar, which may be applied to autonomous driving and internet of vehicles, includes: a laser: emit N laser beams, and transmit the beams to N first beam splitting modules; first beam splitting module: split the received laser beam into a first laser beam and a second laser beam; an included angle adjustment module: receive N second laser beams, adjust an included angle between any two adjacent second laser beams in the N second laser beams to be greater than 0 degrees and not greater than an angular resolution; a scanning module: receive the N second laser beams, respectively emit the N second laser beams to a detection area at different detection angles; a detection module: receive the first laser beam and a corresponding echo signal, perform frequency mixing to obtain a beat frequency signal, determine association information of a target object based on the beat frequency signal.

17 Claims, 12 Drawing Sheets

(51) Int. Cl.
   *G01S 7/4912* (2020.01)
   *G01S 7/4914* (2020.01)
(58) Field of Classification Search
   CPC ........ G01S 17/89; G01S 7/4814; G01S 7/493;
            G01S 17/88; G01S 7/481; G01S 7/487;
                                            G01S 17/08
   USPC ...................................................... 356/5.09
   See application file for complete search history.

(56) References Cited

U.S. PATENT DOCUMENTS

| | | |
|---|---|---|
| 10,971,898 B2 * | 4/2021 | Cao ....................... H01S 5/1838 |
| 2010/0090887 A1 | 4/2010 | Cooper et al. |
| 2012/0169525 A1 | 7/2012 | Klar et al. |
| 2017/0131397 A1 | 5/2017 | Schoor |
| 2018/0143302 A1 | 5/2018 | Osiroff et al. |

FOREIGN PATENT DOCUMENTS

| | | |
|---|---|---|
| CN | 109196370 A | 1/2019 |
| WO | 2018102188 A1 | 6/2018 |

* cited by examiner

LASER RADAR AND LASER RADAR DETECTION METHOD

CROSS-REFERENCE TO RELATED APPLICATIONS

This application is a continuation of International Application No. PCT/CN2020/095952, filed on Jun. 12, 2020, which claims priority to Chinese Patent Application No. 201910561295.2, filed on Jun. 26, 2019. The disclosures of the aforementioned applications are hereby incorporated by reference in their entireties.

TECHNICAL FIELD

This application relates to the field of laser detection technologies, and in particular, to a laser radar and a laser radar detection method.

BACKGROUND

A laser radar (LiDAR) is a radar system that detects a feature quantity such as a position and a speed of a target by emitting a laser beam. A working principle of the laser radar is to transmit a detection signal (a laser beam) to a target object (for example, a vehicle, an airplane, or a missile), and then compare a received signal (an echo signal) reflected from the target object with the transmitted signal and process the received signal, to obtain information about the target object, for example, a distance, an orientation, a height, a speed, a posture, even a shape, or another parameter of the target, so as to detect, track, and identify the target object.

Currently, a vehicle-mounted laser radar that is commonly used includes a ranging laser radar based on pulsed time-of-flight (TOF) and a frequency-modulated continuous wave (FMCW) coherent ranging laser radar. Because the FMCW laser radar uses a coherent detection technology, it is difficult for an external interference beam to be coherently mixed with a local reference beam, to generate a beat frequency signal. Therefore, the FMCW radar has relatively good anti-interference performance. A laser beam emitted by the FMCW radar is a frequency-modulated continuous laser. The laser beam is split into two beams, where one beam is used as a local reference beam, and the other beam is used as a detection beam and is emitted to a detection area. After the detection beam meets a target object in the detection area, an echo signal is reflected, and a detector calculates a distance between the object and the radar based on the echo signal and the intrinsic reference beam.

However, a range resolution of the FMCW laser radar is c/2B, where c is the speed of light and B is a modulation (frequency sweep) bandwidth. To achieve a centimeter-level distance resolution, a frequency modulation bandwidth of more than 10 GHz is required. For the vehicle-mounted FMCW laser radar, the bandwidth whose frequency is modulated to more than 10 GHz requires a frequency modulation time in a time scale far greater than microsecond (generally in a time scale above sub-millisecond). In this way, it takes more than $10^{-4}$ seconds to scan a target point, that is, only about 10,000 points can be scanned in one second. If a frame frequency is 24 frames per second, there are only about 400 points in each frame. This causes low point cloud density and a low image definition.

SUMMARY

This application provides a laser radar and a laser radar detection method, so that association information of a target object that is obtained through one scan increases. This may improve point cloud density determined based on the association information of the target object, and further improve an image definition.

According to a first aspect, this application provides a laser radar. The laser radar includes a laser, N first beam splitting modules, an included angle adjustment module, N detection modules, a scanning module, and a processing control module, where N is an integer greater than 1. The laser is configured to emit N laser beams, and transmit the N laser beams to the N first beam splitting modules. For each of the N first beam splitting modules, each first beam splitting module is configured to split the received laser beam into a first laser beam and a second laser beam, to obtain N first laser beams and N second laser beams. The included angle adjustment module is configured to: receive the N second laser beams from the N first beam splitting modules, and adjust an included angle between any two adjacent second laser beams in the N second laser beams to be greater than 0 degrees and not greater than an angular resolution of the laser radar. The scanning module is configured to: receive the N second laser beams from the included angle adjustment module, and respectively emit the N second laser beams to a detection area at different detection angles. For each of the N detection modules, each detection module is configured to: receive the first laser beam from the corresponding first beam splitting module, receive a corresponding echo signal, perform frequency mixing on the received first laser beam and the received echo signal to obtain a beat frequency signal, and determine association information of a target object in the detection area based on the beat frequency signal, where the corresponding echo signal is a signal reflected by the second laser beam from the corresponding first beam splitting module in the detection area. The processing control module is configured to control the scanning module to be at different detection angles.

It should be noted that the N laser beams and the N first beam splitting modules are in a one-to-one correspondence, that is, one laser beam may be emitted to one first beam splitting module. That the N first beam splitting modules and the N detection modules are in a one-to-one correspondence may be understood as that one detection module corresponds to one first beam splitting module. For example, an $i^{th}$ detection module corresponds to an $i^{th}$ first beam splitting module. In addition, one echo signal corresponds to one second laser beam emitted to the detection area, that is, the N second laser beams correspond to N echo signals, and the N echo signals and the N second laser beams are in a one-to-one correspondence. For example, an $i^{th}$ second laser beam corresponds to an $i^{th}$ echo signal, where i is an integer greater than 0 and less than N.

Based on this solution, an included angle between any two adjacent second laser beams in the N second laser beams is adjusted to be greater than 0 degrees and not greater than the angular resolution of the laser radar, that is, the second laser beams alternately scan the detection area. The scanning module emits the N second laser beams to the detection area for detection at each detection angle, and receives the N reflected echo signals. Association information of one target object may be determined based on one echo signal and one first laser beam, and N pieces of association information may be determined based on the N echo signals and the corresponding N first laser beams. In other words, a relatively large amount of association information is obtained in one detection process by using the laser radar in this application. Because the association information of the target object may be used to form an image, point cloud density that is determined based on the relatively large amount of association information is relatively high, and a definition of the formed image is also relatively high.

To reduce crosstalk between the echo signals as much as possible, a frequency modulation rate of the laser beam may be changed, so as to avoid the crosstalk between the echo signals as much as possible. This application provides the following two possible implementations.

Implementation 1: A modulator performs modulation.

In Implementation 1, the laser radar further includes the modulator. The modulator is configured to modulate the N laser beams from the laser based on a first preset condition, where the first preset condition is that two laser beams whose included angle is less than a preset angle use different frequency modulation rates.

Implementation 2: The laser performs modulation.

In Implementation 2, the laser is further configured to modulate the N laser beams based on a first preset condition, where the first preset condition is that two laser beams whose included angle is less than a preset angle use different frequency modulation rates. Specifically, the laser may modulate a wavelength (frequency) of the laser beam based on the first preset condition, where the laser radar may include N lasers.

Crosstalk between echo signals corresponding to two laser beams whose included angle is less than the preset angle may be relatively large. Based on the foregoing two implementations, the echo signals corresponding to two laser beams that are modulated at different frequency modulation rates do not affect each other. In other words, crosstalk between echo signals is reduced.

In a possible implementation, all laser beams obtained after the N laser beams are modulated based on the first preset condition are frequency-modulated continuous waves FMCWs. In this way, because the FMCW measures the association information of the target object according to a coherent detection principle, it is usually difficult for an external interference beam to be coherently mixed with an intrinsic beam, to generate a beat frequency signal. Therefore, that the laser beam is an FMCW helps improve an anti-interference ability of the laser radar. Further, when the laser beam is an FMCW, a motion speed of the target object relative to the laser radar may further be measured by using a Doppler effect. This helps extend an application scenario of the laser radar.

Based on Implementation 1, when the modulator modulates the N laser beams, the processing control module is further configured to control synchronization between the scanning module and the modulator.

Further, when the modulator modulates the N laser beams, the processing control module is further configured to control synchronization between the scanning module, the detection module, and the modulator.

Based on Implementation 2, when the laser modulates the N laser beams, the processing control module is further configured to control synchronization between the scanning module and the laser.

Further, when the laser modulates the N laser beams, the processing control module is further configured to control synchronization between the scanning module, the laser, and the detection module.

In a possible implementation, the included angle adjustment module includes N optical fibers and a collimator, and the N optical fibers and the N second laser beams are in a one-to-one correspondence. For each of the N optical fibers, each optical fiber is configured to: receive the second laser beam from the corresponding first beam splitting module, and transmit the received second laser beam to the collimator. The collimator is configured to: receive the N second laser beams from the N optical fibers, and collimate the N second laser beams, to obtain the N second laser beams in which an included angle between any two adjacent second laser beams is greater than 0 degrees and not greater than the angular resolution of the laser radar.

Beam outlets of the N optical fibers may be located on a focal plane in object space of the collimator.

Optionally, the scanning module may be located on a focal plane in image space of the collimator.

To transmit the echo signal to the corresponding detection module, the laser radar further includes N optical splitting modules. For each of the N optical splitting modules, each optical splitting module is configured to transmit the received echo signal to the corresponding detection module, where the N optical splitting modules and the N echo signals are in a one-to-one correspondence. It may be understood that one second laser beam corresponds to one echo signal, one echo signal corresponds to one optical splitting module, and one echo signal also corresponds to one detection module. For example, an $i^{th}$ echo signal corresponds to an $i^{th}$ optical splitting module, and corresponds to an $i^{th}$ detection module. After receiving the $i^{th}$ echo signal, the $i^{th}$ optical splitting module may transmit the $i^{th}$ echo signal to the $i^{th}$ detection module.

In this application, the laser beam may be transmitted in space, or may be transmitted through an optical fiber. When the laser beam is transmitted through the optical fiber, the optical splitting module may be an optical fiber circulator, and the optical fiber circulator is located between the first beam splitting module and the included angle adjustment module. The laser is connected to the N first beam splitting modules through optical fibers, the N first beam splitting modules are connected to the N optical fiber circulators through optical fibers, and the N fiber circulators are connected to the included angle adjustment module through optical fibers.

According to a second aspect, this application provides a laser radar. The laser radar includes a laser, N first beam splitting modules, N detection modules, an optical phased array (OPA), and a processing control module. The laser is configured to emit N laser beams, and transmit the N laser beams to the N first beam splitting modules. For each of the N first beam splitting modules, each first beam splitting module is configured to split the received laser beam into a first laser beam and a second laser beam. The OPA is configured to: receive N second laser beams from the N first beam splitting modules, adjust an included angle between any two adjacent second laser beams in the N second laser beams to be greater than 0 degrees and not greater than an angular resolution of the laser radar, and respectively emit the N second laser beams in which an included angle between any two adjacent second laser beams is greater than 0 degrees and not greater than the angular resolution of the laser radar to a detection area at different detection angles. For each of the N detection modules, each detection module is configured to: receive the first laser beam from the corresponding first beam splitting module, receive a corresponding echo signal from the detection area, perform frequency mixing on the received first laser beam and the received echo signal to obtain a beat frequency signal, and determine association information of a target object in the detection area based on the beat frequency signal. The processing control module is configured to control the OPA to be at different detection angles.

It should be noted that the N laser beams and the N first beam splitting modules are in a one-to-one correspondence, that is, one laser beam may be emitted to one first beam splitting module. That the N first beam splitting modules and the N detection modules are in a one-to-one correspondence may be understood as that one detection module corresponds to one first beam splitting module. For example, an $i^{th}$ detection module corresponds to an $i^{th}$ first beam splitting module. In addition, one echo signal corresponds to one second laser beam emitted to the detection area, that is, the N second laser beams correspond to N echo signals, and the N echo signals and the N second laser beams are in a one-to-one correspondence. For example, an $i^{th}$ second laser beam corresponds to an $i^{th}$ echo signal, where i is any integer from 1 to N.

Based on this solution, an included angle between any two adjacent second laser beams in the N second laser beams is adjusted to be greater than 0 degrees and not greater than the angular resolution of the laser radar, that is, the second laser beams are alternate. The OPA emits the N second laser beams to the detection area for detection at each detection angle, and receives the N reflected echo signals. Association information of one target object may be determined based on one echo signal and one first laser beam, and N pieces of association information may be determined based on the N echo signals and the corresponding N first laser beams. In other words, a relatively large amount of association information is obtained in one detection process by using the laser radar in this application, that is, a plurality of scanning spots are obtained in one detection process. Because the association information of the target object may be used to form an image, point cloud density that is determined based on the relatively large amount of association information is relatively high, and a definition of the formed image is also relatively high.

In a possible implementation, the OPA may perform phase modulation on wavefronts of the N second laser beams, to obtain the N second laser beams in which an included angle between any two adjacent second laser beams is greater than 0 degrees and not greater than the angular resolution of the laser radar.

According to a third aspect, this application provides a laser radar detection method, where the laser radar detection method may be applied to a laser radar. The method includes: splitting each of N laser beams into a first laser beam and a second laser beam, to obtain N first laser beams and N second laser beams; adjusting an included angle between any two adjacent second laser beams in the N second laser beams to be greater than 0 degrees and not greater than an angular resolution of the laser radar, and respectively emitting the adjusted N second laser beams to a detection area at different detection angles; receiving N echo signals from the detection area, where the N echo signals and the N second laser beams emitted to the detection area are in a one-to-one correspondence; and for each of the N echo signals, performing frequency mixing on the echo signal and the corresponding first laser beam, to obtain a beat frequency signal, and determining association information of a target object in the detection area based on the beat frequency signal.

In a possible implementation, the N laser beams are modulated based on a first preset condition, where the first preset condition is that two laser beams whose included angle is less than a preset angle use different frequency modulation rates.

In a possible implementation, all laser beams obtained after the N laser beams are modulated based on the first preset condition are frequency-modulated continuous waves FMCWs.

According to a fourth aspect, this application provides a laser radar, where the laser radar includes modules/units for performing the method in any one of the third aspect or the possible implementations of the third aspect. These modules/units may be implemented by hardware, or may be implemented by hardware by executing corresponding software.

According to a fifth aspect, this application provides a computer storage medium. The computer storage medium stores program instructions, and when the program instructions are run on a laser radar, the laser radar is enabled to perform the method in any one of the third aspect or the possible implementations of the third aspect.

According to an eighth aspect, this application provides a computer program product, and when the computer program product is run on a laser radar, the laser radar is enabled to perform the method in any one of the third aspect or the possible implementations of the third aspect.

DESCRIPTION OF EMBODIMENTS

Figure 1:
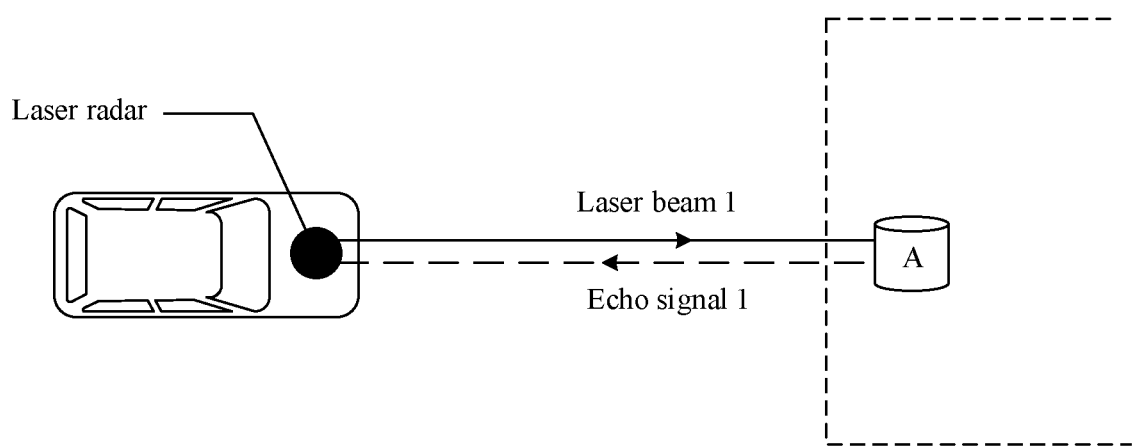
FIG. 1 is a schematic diagram of detection of a laser radar according to this application.

A laser radar usually works by transmitting a high-frequency electromagnetic wave and receiving electromagnetic energy scattered by a target. By comparing and analyzing a received echo signal and a detection signal, information about the target may be extracted, for example, position information of the target. FIG. 1 is a schematic diagram of detection of a laser radar according to this application. The laser radar includes a laser and a detector. The laser emits a laser beam in a specific direction. If there is a target within a specific distance in the direction of emitting the laser beam, the laser beam may be reflected by a surface of the target. In FIG. 1, an example in which there is a target A in a direction of emitting a laser beam 1 is used. After the laser beam 1 emitted by the laser reaches the target A, the laser beam 1 is reflected by a surface of the target A, and a reflected signal returns to the detector of the laser radar as an echo signal. The detector may determine association information, for example, position information of the target A, of the target A based on the echo signal and a local signal.

The laser radar may be used in a scenario requiring relatively high accuracy, such as a vehicle-mounted laser radar (for example, a scanning vehicle-mounted FMCW laser radar) or an airborne laser radar. In addition, the laser radar may also be installed on a mobile platform such as a satellite. In this case, the laser radar needs assistance of another device on the mobile platform to determine a current position and steering information of the laser radar. This ensures availability of measurement data. For example, the mobile platform may further include a global positioning system (GPS) apparatus and an inertial measurement unit (IMU) apparatus. The laser radar may obtain a feature quantity such as a position and a speed of a target object with reference to measurement data of the GPS apparatus and the IMU apparatus. For example, the radar may provide geographic position information of the mobile platform by using the GPS apparatus on the mobile platform, and record a posture and steering information of the mobile platform by using the IMU apparatus. After a distance from the target object is determined based on an echo signal, a measurement point of the target object may be converted from a position point in a relative coordinate system to a position point in an absolute coordinate system by using at least one of the geographic position information provided by the GPS apparatus or the posture and the steering information provided by the IMU apparatus, to obtain geographic location information of the target object. In this way, the laser radar can be applied to the mobile platform. It may be understood that the laser radar in this application may further be applied to a scenario such as autonomous driving or internet of vehicles.

Figure 2:
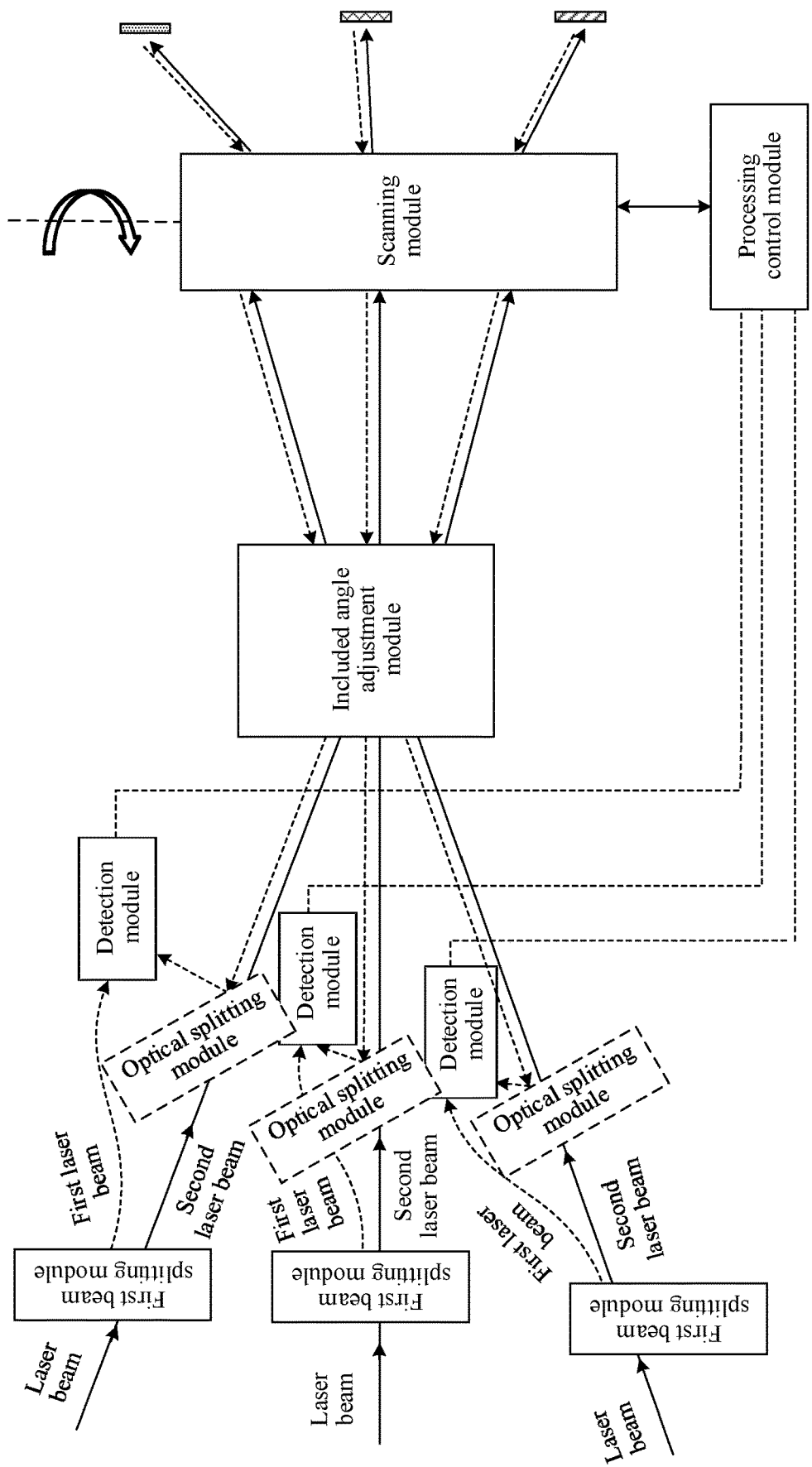
FIG. 2 is a schematic structural diagram of a laser radar according to this application.

Based on above the foregoing content, FIG. 2 is a schematic structural diagram of an example of a laser radar according to this application. As shown in FIG. 2, the laser radar includes a laser, N first beam splitting modules, an included angle adjustment module, N detection modules, a scanning module, and a processing control module. FIG. 2 provides description by using an example in which N is equal to 3. The laser is configured to emit N laser beams, and transmit the N laser beams to the N first beam splitting modules. For each of the N first beam splitting modules, each first beam splitting module is configured to split the received laser beam into a first laser beam and a second laser beam, to obtain N first laser beams and N second laser beams. It may also be understood that a $k^{th}$ first beam splitting module in the N first beam splitting modules is configured to split the received laser beam into a $k^{th}$ first laser beam and a $k^{th}$ second laser beam, where k ranges from 1 to N. The first laser beam is a local signal, and may also be referred to as an intrinsic beam. The second laser beam is a detection signal, and may also be referred to as a detection beam. The included angle adjustment module is configured to: receive the N second laser beams from the N first beam splitting modules, and adjust an included angle between any two adjacent second laser beams in the N second laser beams to be greater than 0 degrees and not greater than an angular resolution of the laser radar. The scanning module is configured to: receive the N second laser beams from the included angle adjustment module, and respectively emit the N second laser beams to a detection area at different detection angles. For each of the N detection modules, each detection module is configured to: receive the first laser beam from the corresponding first beam splitting module, receive a corresponding echo signal from the detection area, perform frequency mixing on the received first laser beam and the received echo signal to obtain a beat frequency signal, and determine association information of a target object in the detection area based on the beat frequency signal. It may also be understood that a $k^{th}$ detection module in the N detection modules is configured to receive the $k^{th}$ first laser beam from the $k^{th}$ first beam splitting module, receive a $k^{th}$ echo signal from the detection area, perform frequency mixing on the $k^{th}$ first laser beam and the $k^{th}$ echo signal to obtain a beat frequency signal, and determine association information of the target object in the detection area based on the beat frequency signal, where k ranges from 1 to N. The processing control module is configured to control the scanning module to be at different detection angles. It should be understood that the processing control module may control the scanning module to be at a detection angle, or continuously rotate to a detection angle. The scanning module may be at different detection angles, and emit the N second laser beams to the detection area at each detection angle.

The N laser beams and the N first beam splitting modules are in a one-to-one correspondence, and the N first beam splitting modules and the N detection modules are in a one-to-one correspondence, where N is an integer greater than 1. It may also be understood that one laser beam may be transmitted to one first beam splitting module, and one first beam splitting module may correspond to one detection module.

It should be noted that the angular resolution of the laser radar may also be referred to as a scanning resolution of the laser radar, and is a preset included angle between adjacent laser beams that are emitted to the detection area, or is an expected included angle between adjacent laser beams that are emitted to the detection area.

Based on the foregoing laser radar, an included angle between any two adjacent second laser beams in the N second laser beams is adjusted to be greater than 0 degrees and not greater than the angular resolution of the laser radar, that is, the second laser beams alternately scan the detection area. The scanning module emits the N second laser beams to the detection area for detection at each detection angle, and receives N reflected echo signals. Association information of one target object may be determined based on one echo signal and one first laser beam, and N pieces of association information may be determined based on the N echo signals and the corresponding N first laser beams. In other words, a relatively large amount of association information is obtained in one detection process by using the laser radar in this application. Because the association information of the target object may be used to form an image, point cloud density that is determined based on the relatively large amount of association information is relatively high, and a definition of the formed image is also relatively high. It should be understood that there may be one or more target objects.

The following describes each functional module and structure shown in FIG. 2, to provide an example of a specific implementation.

1. Laser

In this application, N laser beams may be output by N lasers, or the N laser beams may be obtained through splitting performed by a beam splitting module after one laser outputs one laser beam. Alternatively, K lasers may output K laser beams, and then the beam splitting module splits one or more of the K laser beams to obtain the N laser beams, where K is an integer less than N. In other words, the laser radar may include one laser, or may include N lasers, or may include K lasers. The following describes the three scenarios.

Case 1: The laser radar includes one laser.

Figure 3A:
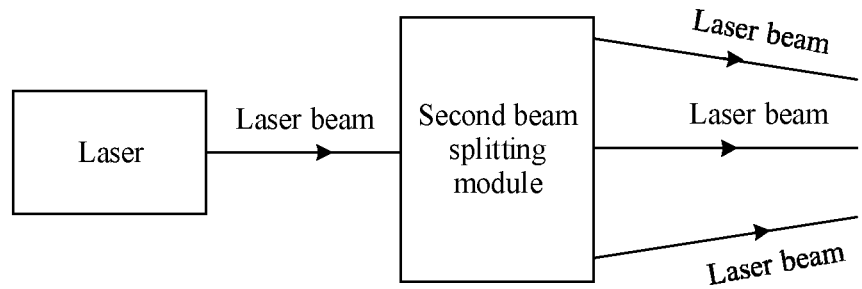
FIG. 3a is a schematic diagram of an optical splitting principle of a second beam splitting module according to this application.

In Case 1, the laser radar further includes a second beam splitting module, the second beam splitting module is located between the laser and the first beam splitting module, and the second beam splitting module is configured to split one laser beam emitted by the laser to N laser beams. As shown in FIG. 3a, the following provides description by using an example in which the second beam splitting module splits one laser beam emitted by the laser to three laser beams.

In a possible implementation, the second beam splitting module may be a diffractive optical element (DOE). The DOE may evenly split one laser beam from the laser into N laser beams, and transmission directions of the N laser beams may be different, or may be the same. It may be understood that a quantity of laser beams split by the DOE and a spacing between the laser beams may be determined by a physical structure of the DOE. In other words, the physical structure of the DOE may be determined based on a spacing between the N laser beams. In this implementation, the first beam splitting module and the second beam splitting module may be the same. When the first beam splitting module is a DOE, and N is equal to 2, that is, when the DOE is used as the first beam splitting module, the DOE may split one received laser beam into a first laser beam and a second laser beam, that is, the DOE splits the received laser beam into two beams.

Figure 3B:
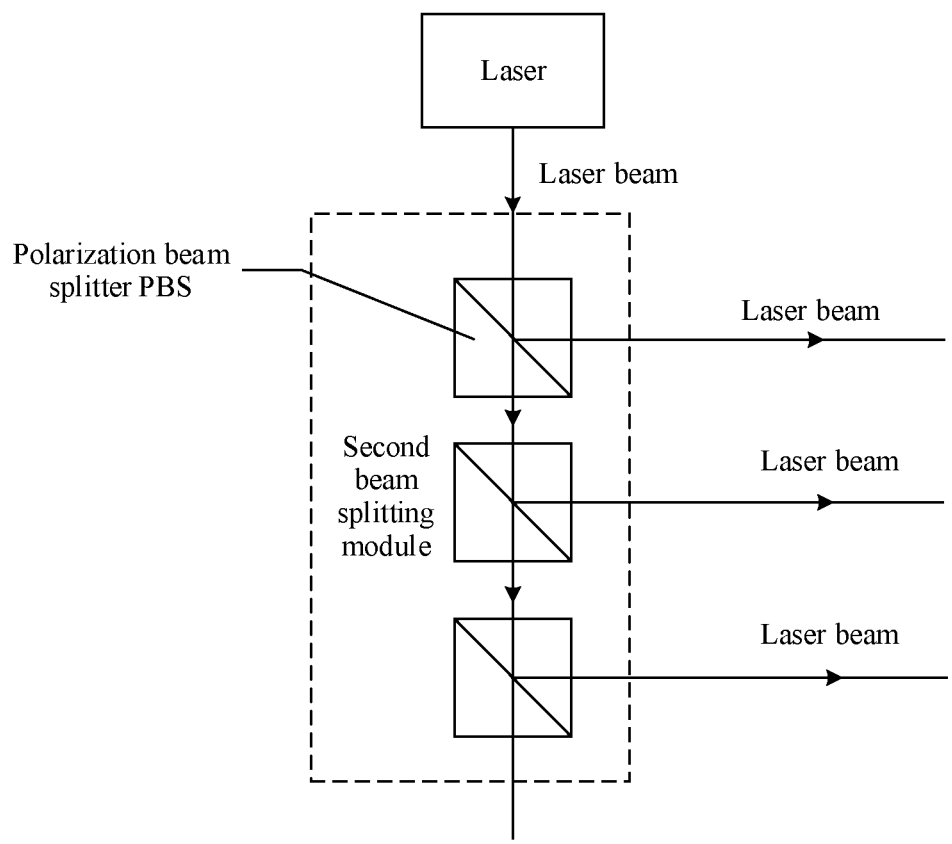
FIG. 3b is a schematic diagram of an optical splitting principle of another second beam splitting module according to this application.

In another possible implementation, the second beam splitting module may be a polarizing beam splitter (PBS) array. FIG. 3b is a diagram of an optical splitting principle of another second beam splitting module according to this application. FIG. 3b provides description by using an example in which one laser beam emitted by the laser is split into three laser beams. The laser emits one laser beam to the PBS array, and the PBS may split the incident laser beam into two linearly polarized beams, that is, a P-polarized beam and an S-polarized beam. The P-polarized beam is transmitted through the PBS as an incident laser beam of a next PBS, while the S-polarized beam is reflected to a corresponding first beam splitting module at an angle of 45 degrees. An angle between an emergent direction of the S-polarized beam and a transmission direction of the P-polarized beam is 90 degrees. It should be understood that N laser beams may be reflected from N PBSs. In this implementation, the first beam splitting module may be a PBS in the PBS array.

Case 2: The laser radar includes N lasers.

Figure 3C:
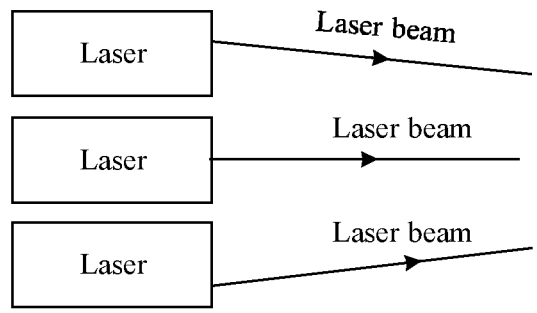
FIG. 3c is a schematic diagram of a relationship between a laser and a laser beam according to this application.

In Case 2, as shown in FIG. 3c, one laser emits one laser beam, and the N lasers emit N laser beams. In FIG. 3c, three lasers are used as an example for description. It should be understood that any two of the N laser beams emitted by the N lasers may have an included angle, or may be parallel.

Case 3: The laser radar includes K lasers.

Figure 3D:
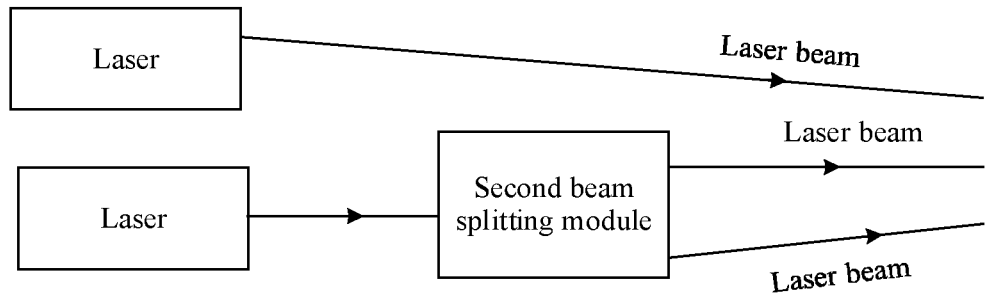
FIG. 3d is a schematic diagram of another relationship between a laser and a laser beam according to this application.

In Case 3, as shown in FIG. 3d, the following provides description by using an example in which K is equal to 2 and N is equal to 3. To be specific, for example, two lasers emit three laser beams, and a second beam splitting module is further included between one laser and the first beam splitting module. For the second beam splitting module, refer to the description in Case 1. Details are not described herein again.

It should be understood that, in Case 1, Case 2, and Case 3, when the laser radar is used as a vehicle-mounted radar, the laser may emit a laser beam with a wavelength of 905 nm, or may emit a laser beam with a wavelength of 1550 nm. Optionally, the laser may be a semiconductor laser, or may be a fiber laser.

2. Detection Module

After the second laser beam is emitted to the target object by the scanning module, the target object reflects the echo signal. After the echo signal is transmitted to the detection module, the detection module performs frequency mixing on the echo signal and the first laser beam. For example, the detection module may convert the beat frequency signal obtained through frequency mixing of the echo signal and the first laser beam into an analog signal or a digital signal through optical-to-electrical conversion.

Because an included angle between any two adjacent second laser beams in the N second laser beams is relatively small, an echo signal of one second laser beam may be emitted to the detection module corresponding to another second laser beam. This causes crosstalk between two echo signals. For example, two laser beams are respectively a laser beam A and a laser beam B. The laser beam A may be split into a first laser beam A and a second laser beam A by using the first beam splitting module, and an echo signal of the second laser beam A is an echo signal A. The laser beam B may be split into a first laser beam B and a second laser beam B by using the first beam splitting module, and an echo signal of the second laser beam B is an echo signal B. Because an included angle between the second laser beam A and the second laser beam B is relatively small, the echo signal A may be emitted to the detection module corresponding to the second laser beam B, and the echo signal B may alternatively be emitted to the detection module corresponding to the second laser beam A. In this way, the detection module may perform frequency mixing on the echo signal A and the first laser beam B, and perform frequency mixing on the echo signal B and the first laser beam A. This causes crosstalk between the echo signal A and the echo signal B.

In addition, in the detection module, that the beat frequency signal is formed between the first laser beam and the echo signal usually requires that a frequency modulation rate of the first laser beam is consistent with (for example, the same as) a frequency modulation rate of the echo signal in frequency modulation duration in a modulation period. Based on the foregoing description, frequency modulation rates of the N laser beams may be changed, to avoid crosstalk between the echo signals as much as possible. In this application, the N laser beams may be modulated based on a first preset condition, to reduce the crosstalk between the echo signals. The first preset condition is that two laser beams whose included angle is less than a preset angle use different frequency modulation rates. For example, the preset angle may be a critical angle at which crosstalk is generated between echo signals corresponding to two laser beams. It should be noted that the preset angle is related to a receiving angle (which is also referred to as an angle of view) of the detection module.

It should be noted that a frequency modulation rate $Kr_i$=a frequency modulation bandwidth $B_i$/frequency modulation duration t. The frequency modulation duration t is first duration that starts from a moment at which an initial frequency is modulated to a moment at which a frequency of a laser beam reaches a maximum value.

Figure 4A:
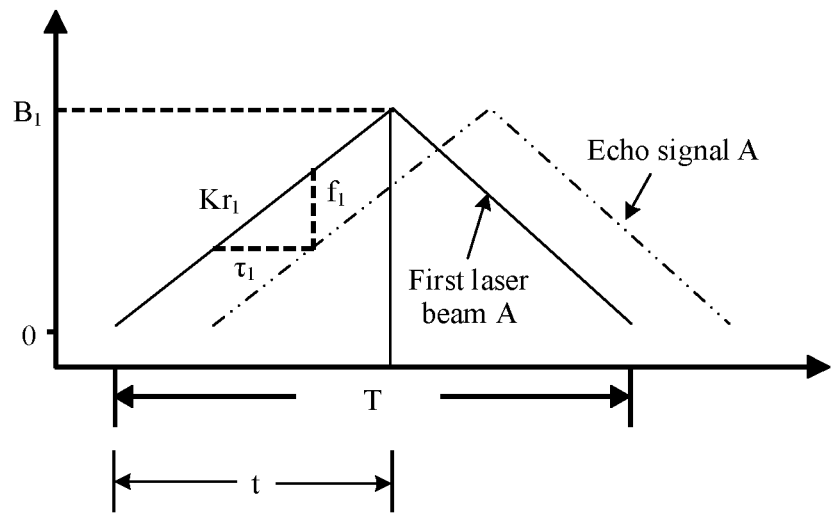
FIG. 4a is a schematic diagram of performing frequency mixing on a first laser beam and an echo signal according to this application.

A modulation scheme of the laser beam may be a sawtooth wave modulation scheme, or may be a triangular wave modulation scheme. This is not limited in this application. When the modulation scheme is the triangular wave modulation scheme, the frequency modulation duration is up-frequency modulation duration or down-frequency modulation duration. The up-frequency modulation duration is equal to the down-frequency modulation duration, the frequency modulation duration t=T/2 (as shown in FIG. 4a), and T represents the frequency modulation period. Specifically, the frequency modulation period is second duration that starts from a moment at which the initial frequency is modulated to a moment at which the frequency of the laser beam returns to the initial frequency. The frequency modulation bandwidth $B_i$ is a difference between the initial frequency and the maximum frequency in the up-frequency modulation duration. When the modulation scheme is the sawtooth wave modulation scheme, the frequency modulation duration t is equal to T.

The N laser beams are modulated based on the first preset condition in the following two possible implementations provided by this application.

Implementation 1: One laser beam corresponds to one frequency modulation rate, that is, the N laser beams and N frequency modulation rates are in a one-to-one correspondence, and the N frequency modulation rates are different.

For example, a $p^{th}$ laser beam may be modulated at an $m^{th}$ frequency modulation rate, and a $q^{th}$ laser beam may be modulated at an $n^{th}$ frequency modulation rate, where the $m^{th}$ frequency modulation rate is different from the $n^{th}$ frequency modulation rate, and the $p^{th}$ laser beam is also different from the $q^{th}$ laser beam. The $m^{th}$ frequency modulation rate is one of the N frequency modulation rates, the $n^{th}$ frequency modulation rate is one of the N frequency modulation rates other than the $m^{th}$ frequency modulation rate, and the $p^{th}$ laser beam and the CO laser beam are two different laser beams in the N laser beams. Crosstalk between the echo signals corresponding to the second laser beams can be avoided by modulating laser beams at different frequency modulation rates. The following describes the beneficial effects in detail with reference to specific examples in this application.

Figure 4B:
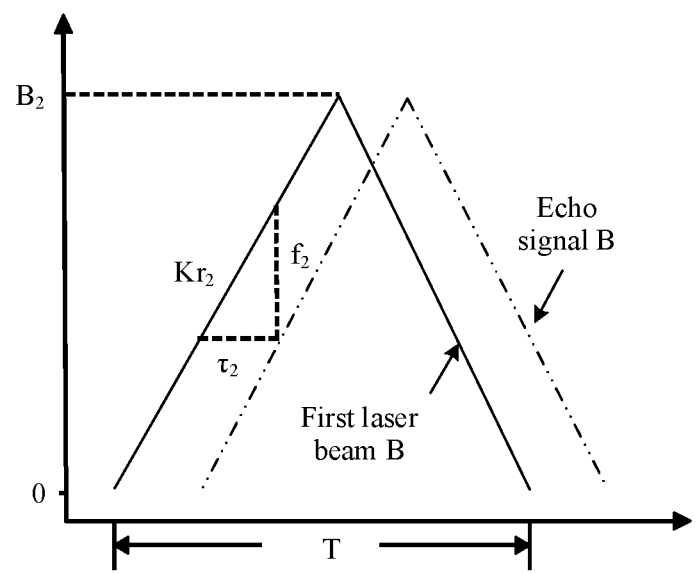
FIG. 4b is another schematic diagram of performing frequency mixing on a first laser beam and an echo signal according to this application.
Figure 4C:
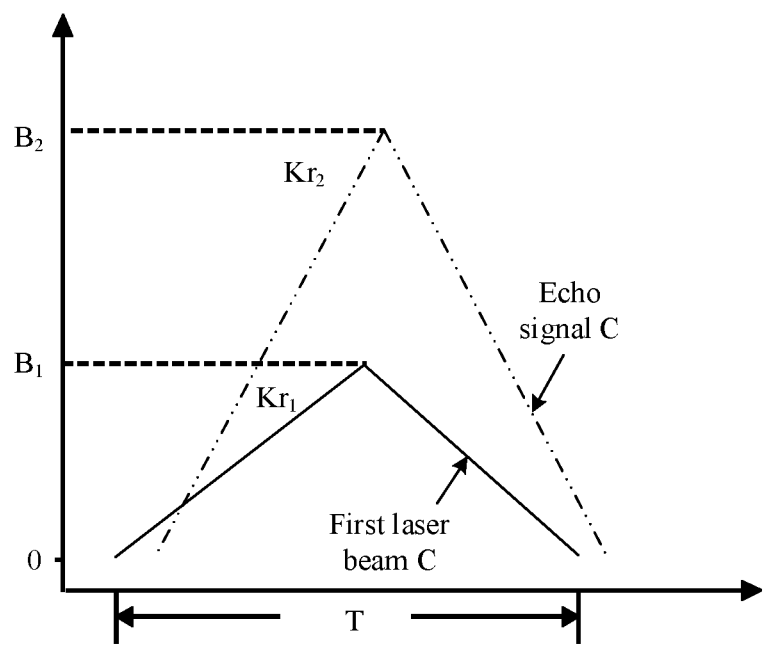
FIG. 4c is still another schematic diagram of performing frequency mixing on a first laser beam and an echo signal according to this application.

FIG. 4a, FIG. 4b, and FIG. 4c are three schematic diagrams of performing frequency mixing on a first laser beam and an echo signal according to this application. The laser beam A and the laser beam B are used as an example for description. The laser beam A may be split into the first laser beam A and the second laser beam A by using the first beam splitting module, and the echo signal A is the echo signal of the second laser beam A. The laser beam B may be split into the first laser beam B and the second laser beam B by using the first beam splitting module, and the echo signal B is the echo signal of the second laser beam B. In FIG. 4a, FIG. 4b, and FIG. 4c, modulation periods of the laser beam A and the laser beam B are both T, and modulation schemes of the laser beam A and the laser beam B are both triangular wave modulation.

As shown in FIG. 4a, the laser beam A is modulated by using a frequency modulation rate $Kr_1$ and a frequency modulation bandwidth $B_1$, and a frequency modulation rate of the first laser beam is consistent with a frequency modulation rate of the echo signal in the frequency modulation duration. In other words, the frequency modulation rate of the first laser beam A is the same as the frequency modulation rate of the corresponding echo signal A in the frequency modulation duration t, and a time point at which the echo signal A arrives at the detection module is delayed by $\tau_1$ compared with a time point at which the first laser beam A arrives at the detection module. Therefore, frequency mixing is performed on the echo signal A and the first laser beam A, to obtain a beat frequency signal with a frequency $f_1=Kr_1\times\tau_1$. The frequency modulation rate $Kr_1$ may be a first frequency modulation rate in the N frequency modulation rates.

As shown in FIG. 4b, the laser beam B is modulated by using a frequency modulation rate $Kr_2$ and a frequency modulation bandwidth $B_2$, and a frequency modulation rate of the first laser beam is consistent with a frequency modulation rate of the echo signal in the frequency modulation duration. In other words, the frequency modulation rate of the first laser beam B is the same as the frequency modulation rate of the corresponding echo signal B in the frequency modulation duration t, and a time point at which the echo signal B arrives at the detection module is delayed by $\tau_2$ compared with a time point at which the first laser beam B arrives at the detection module. Therefore, frequency mixing is performed on the echo signal B and the first laser beam B, to obtain a beat frequency signal with a frequency $f_1=Kr_2\times\tau_2$, where the frequency modulation rate $Kr_2$ may be the second frequency modulation rate in the N frequency modulation rates.

As shown in FIG. 4c, there is a relatively large difference between the frequency modulation rate of the first laser beam A and the frequency modulation rate the echo signal B (that is, the first laser beam A and the echo signal B are not coherent signals). Therefore, frequency mixing cannot be performed, and a beat frequency signal cannot be obtained. It may also be understood that, even if the echo signal B is emitted to the detection module corresponding to the first laser beam A, that a beat frequency signal is formed between the first laser beam A and the echo signal A is not affected. Therefore, the echo signal B does not affect the echo signal A. This avoids crosstalk between the echo signals.

Further, in a scenario in which laser radars are widely used, for example, in an application scenario of vehicle-mounted FMCW laser radars, a detection beam (a second laser beam) or an echo signal of a vehicle-mounted FMCW laser radar of another vehicle may cause interference to a detection module of the vehicle. To avoid crosstalk in this case as much as possible, the frequency modulation rate $Kr_i$ (i=1, 2, 3 . . . ) may be randomly selected for each of the N laser beams for modulation, and different laser beams correspond to different frequency modulation rates. In this way, an anti-interference ability of the FMCW laser radar can further be enhanced.

Implementation 2: The N laser beams correspond to M frequency modulation rates, and the M frequency modulation rates are different, where M is an integer less than N.

It may also be understood that two or more laser beams in the N laser beams may use one frequency modulation rate. To avoid crosstalk between the echo signals as much as possible, two or more laser beams corresponding to one frequency modulation rate need to meet the following requirement: When an included angle between the laser beams is relatively large (for example, greater than the preset angle), crosstalk between the echo signals corresponding to the second laser beams obtained after the laser beams are split is relatively small.

For ease of description, an example in which N is equal to 3 and M is equal to 2, and the three laser beams are a laser beam a, a laser beam b, and a laser beam c is used for description. When an included angle between the laser beam a and the laser beam b is not greater than the preset angle, an included angle between the laser beam b and the laser beam c is not greater than the preset angle, and an included angle between the laser beam a and the laser beam c is greater than the preset angle, the laser beam a and the laser beam c may be modulated by using a frequency modulation rate ($Kr_4$), and the laser beam b may be modulated by using another frequency modulation rate ($Kr_5$). Because the included angle between the laser beam a and the laser beam c is relatively large, crosstalk between echo signals corresponding to the laser beam a and the laser beam c is relatively small. Even if the laser beam a and the laser beam c are modulated by using a same frequency modulation rate, crosstalk between the echo signals corresponding to the laser beam a and the laser beam c is still relatively small. In addition, although the included angle between the laser beam a and the laser beam b is relatively small, and crosstalk between echo signals corresponding to the laser beam a and the laser beam b is relatively large, the crosstalk between the echo signals corresponding to the laser beam a and the laser beam b may be reduced by modulation by using different frequency modulation rates (for a principle, refer to the description in FIG. 4a, FIG. 4b, and FIG. 4c). Similarly, crosstalk between echo signals corresponding to the laser beam b and the laser beam c may be reduced by modulating the laser beam b and the laser beam c by using different frequency modulation rates.

Based on Implementation 1 and Implementation 2, the laser beam may be modulated by a modulator, or may be modulated by the laser. Optionally, the modulator may be an external modulator. It should be noted that, when the modulator is used for modulation, frequency modulation may usually be performed by an acousto-optic modulator or an electro-optic modulator. When the laser modulates the N laser beams, a wavelength-tunable laser may usually be used for modulation. (1) The acoustic-optic modulator is usually an acoustic-optic device that controls a change in laser beam intensity. Acousto-optic modulation is an external modulation technology. A modulated signal is applied to an electro-acoustic transducer in a form of an electrical signal (obtained through amplitude modulation), and then is converted into an ultrasonic wave field that changes in a form of an electrical signal. When an optical wave passes through an acousto-optic medium, an optical carrier is modulated and becomes an intensity-modulated wave "carrying" information through an acousto-optic effect. (2) The electro-optic modulator is a modulator made of some electro-optic crystals, for example, a lithium niobate crystal ($LiNbO_3$), a gallium arsenide crystal (GaAs), and a lithium tantalate crystal ($LiTaO_3$) through electro-optic effects. The electro-optic effect means that when a voltage is applied to an electro-optic crystal, a refractive index of the electro-optic crystal changes, and an optical wave feature of the crystal changes. Therefore, modulation of a phase, an amplitude, intensity, a frequency, and a polarization state of an optical signal is implemented. (3) The wavelength-tunable laser may change a wavelength based on a requirement. One method for changing the wavelength is to change a refractive index of a luminescent material by changing an injection current, so as to change and control an output wavelength of the laser within a specific range. There are three principles for implementing laser wavelength tuning. The first principle is to use some elements (for example, a grating) to change a wavelength of a laser beam by changing a wavelength corresponding to a low-loss area of a resonant cavity. The second principle is to change some external parameters (such as a magnetic field and a temperature), so that an energy level of laser transition changes. The third principle is to implement wavelength conversion and tuning (such as non-linear optics and stimulated Raman scattering) by using a non-linear effect.

When the modulator is used to modulate the N laser beams, based on Implementation 1, the laser radar further includes N modulators. The N modulators and the N laser beams are in a one-to-one correspondence, and the N modulators and N frequency modulation rates are in a one-to-one correspondence, that is, each modulator modulates an incident laser beam by using one frequency modulation rate, where the N frequency modulation rates are different. Based on Implementation 2, the laser radar may further include M modulators. An emergent laser beam modulated by a same modulator may be split into two or more beams, and each of the M modulators modulates an incident laser beam by using one frequency modulation rate, where the M modulators and the M frequency modulation rates are in a one-to-one correspondence, and the M frequency modulation rates are different.

It should be noted that when the modulator is used to modulate the N laser beams, the laser included in the laser radar may be any one of Case 1, Case 2, or Case 3.

When the laser is used to modulate the N laser beams, based on Implementation 1, the laser radar includes N lasers, and the N lasers correspond to N different frequency modulation rates. To be specific, the laser may change a wavelength (or a frequency), so that the N lasers use the N different frequency modulation rates. Based on Implementation 2, the laser radar includes M lasers, and the M lasers correspond to M different frequency modulation rates. It should be noted that, two or more laser beams emitted by a same laser may be modulated by using a same frequency modulation rate. In addition, to minimize crosstalk between echo signals corresponding to second laser beams obtained after the two laser beams are split, an included angle between the two laser beams in laser beams emitted by the same laser needs to be relatively large, for example, greater than the preset angle.

Figure 5:
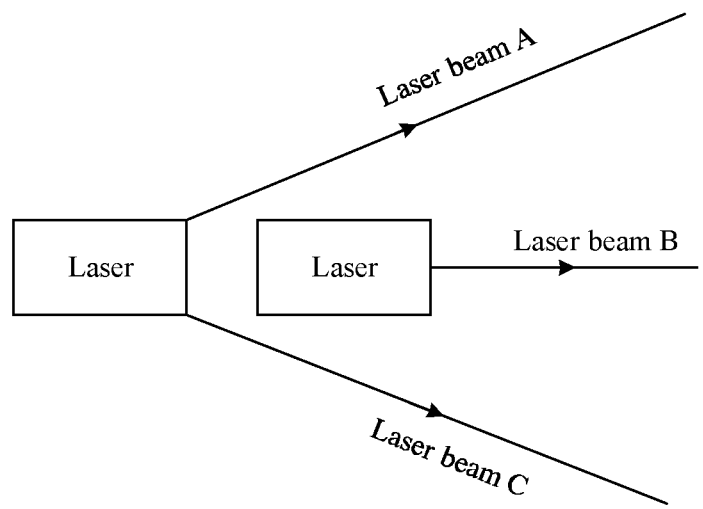
FIG. 5 is a schematic diagram of still another relationship between a laser and a laser beam according to this application.

As shown in FIG. 5, an example in which N is equal to 2 and M is equal to 3 is used for description. To be specific, a laser beam A and a laser beam C may be emitted by one laser, and a laser beam B is emitted by another laser. An included angle between the laser beam A and the laser beam C is relatively large. Therefore, crosstalk between echo signals corresponding to the laser beam A and the laser beam C is relatively small. An included angle between the laser beam B and the laser beam A may be relatively small or relatively large, and an included angle between the laser beam B and the laser beam C may be relatively small or relatively large. If the included angle between the laser beam B and the laser beam A is relatively small and/or the included angle between the laser beam B and the laser beam C is relatively small, the two lasers may modulate the laser beams by using different frequency modulation rates. Specifically, the two lasers are implemented through wavelength tuning. If the included angle between the laser beam B and the laser beam A is relatively large and/or the included angle between the laser beam B and the laser beam C is relatively large, the two lasers may modulate the laser beams by using a same frequency modulation rate, or by using different frequency modulation rates.

It should be noted that the M lasers need to emit N laser beams, and the laser radar further needs to include a second beam splitting module. The second beam splitting module may be disposed between the laser and the first beam splitting module, and the second beam splitting module may split a laser beam emitted by one or more of the M lasers, so that the M lasers emit the N laser beams. For the second beam splitting module, refer to the description of the second beam splitting module in Case 1. Details are not described herein again.

Based on Implementation 1 or Implementation 2, because different second laser beams correspond to different echo signals, frequency mixing can be performed only on the echo signals and first laser beams respectively corresponding to the echo signals, to obtain a beat frequency signal. This effectively avoids crosstalk between the echo signals.

In a possible implementation, the detection module includes a signal receiving unit and a data collection unit. The signal receiving unit may be a detector, for example, any one of a PIN photodiode (which is also referred to as a PIN junction diode), an avalanche photodiode (APD), a PIN photodiode array, or an APD array, or a balanced detector including a combination of PIN photodiodes, or a balanced detector including a combination of APDs, or a balanced detector including a combination of PIN photodiode arrays, or a balanced detector including a combination of APD arrays. For example, the signal receiving unit may be a detector, and the data collection unit may be an analog-to-digital converter (ADC).

3. Included Angle Adjustment Module

In this application, to obtain a relatively large amount of association information of the target object, before the scanning module receives the N second laser beams, an included angle between any two adjacent second laser beams needs to be adjusted, so as to ensure that the included angle between any two adjacent second laser beams in the N second laser beams to be greater than 0 degrees and not greater than an angular resolution of the laser radar. The included angle between any two adjacent second laser beams in the N second laser beams may be adjusted by using a structure of a combination of an optical fiber array and a collimator, or in a manner of an optical phased array (OPA), or by using a combination of reflection mirrors. Adjustment manners are not listed one by one herein. The following describes in detail the structure of the combination of the optical fiber array and the collimator, and the OPA.

Figure 6:
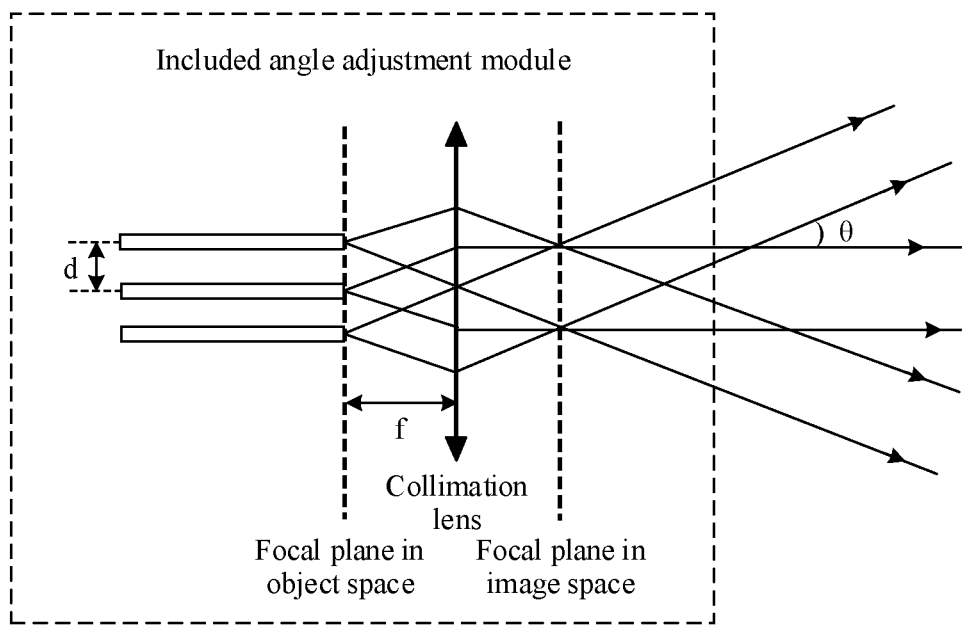
FIG. 6 is a schematic structural diagram of an included angle adjustment module according to this application.

FIG. 6 is a schematic structural diagram of an included angle adjustment module according to this application. The included angle adjustment module includes N optical fibers and a collimator, and the N optical fibers and the N second laser beams are in a one-to-one correspondence, that is, one second laser beam may be coupled into one optical fiber. For each of the N optical fibers, each optical fiber is configured to: receive the second laser beam from the corresponding first beam splitting module, and transmit the received second laser beam to the collimator. It may also be understood that a $k^{th}$ optical fiber in the N optical fibers is configured to: receive a $k^{th}$ second laser beam from a $k^{th}$ first beam splitting module, and transmit the $k^{th}$ second laser beam to the collimator, where k ranges from 1 to N. The collimator is configured to: receive the N second laser beams from the N optical fibers, and collimate the N second laser beams, to obtain the N second laser beams in which an included angle between any two adjacent second laser beams is greater than 0 degrees and not greater than the angular resolution of the laser radar. In a possible implementation, the collimator may be a collimation lens.

Further, beam outlets of the N optical fibers are located on a focal plane in object space of the collimator (as shown in FIG. 6). The N optical fibers form an optical fiber array, and intervals between the optical fibers may be or may not be equal. The interval between the optical fibers and a focal length of the collimator may be controlled, so that the included angle between any two adjacent second laser beams in the N second laser beams emitted from the optical fiber and the collimator may be greater than 0 degrees and not greater than the angular resolution of the laser radar. To be specific, an appropriate optical interval d and focal length f may be selected, so that the included angle between any two adjacent second laser beams in the N second laser beams emitted from the optical fiber and the collimator may be greater than 0 degrees and not greater than the angular resolution of the laser radar.

For example, the included angle θ between any two adjacent second laser beams may be determined by using the following formula (1).

$$\theta=\arctan(d/f) \qquad \text{formula (1)}$$

When an angular resolution θ of the laser radar is equal to 0.1°, the interval d between the optical fibers may be 35 μm, and the focal length f of the collimator may be 2 cm. It may also be understood that, in a possible implementation, the included angle between any two adjacent second laser beams in the N second laser beams is equal to the angular resolution of the laser radar.

It may be understood that when intervals between the optical fibers are equal, included angles θ between any two adjacent second laser beams in the N second laser beams are equal. When the intervals between the optical fibers are not equal, the included angles θ between any two adjacent second laser beams in the N second laser beams are not equal.

4. Scanning Module

Based on the included angle adjustment module shown in FIG. 6, because beam spots of the N second laser beams emitted from the collimator overlap on a focal plane in image space of the collimator, the scanning module may be disposed on the focal plane in image space of the collimation lens.

In a possible implementation, the scanning module may be a scanner, for example, a reflective scanner. The reflective scanner includes, but is not limited to, a mechanical rotating mirror and an MEMS mirror. The reflective scanner changes a scanning direction of the scanner through mechanical rotation. When the scanning module is a reflective scanner, a reflective surface of the reflective scanner may be disposed on the focal plane in image space of the collimation lens. In this way, the beam spots of the N second laser beams may overlap on the reflective surface of the scanner. In addition, because the reflective surface of the scanner does not change the included angle between the second laser beams, when the reflective scanner performs rotary scanning around two rotating shafts that are perpendicular to each other, the N second laser beams may be emitted by the scanner to the detection area, and the included angle between any two adjacent second laser beams is greater than 0 degrees and is not greater than the angular resolution of the laser radar. Optionally, the scanner may be in a continuous mode of operation, or may be in a stepping mode of operation.

The included angle adjustment module is configured to transmit the N second laser beams to the scanning module, and the scanning module emits the N second laser beams to the detection area. The laser radar can scan the detection area by changing the detection angle of the scanning module. For example, the laser radar may preset a plurality of detection angles, and the scanning module may emit the N second laser beams to the detection area at each of the plurality of detection angles, to further obtain association information, for example, a distance, of the target object in the detection area. Then, a scanned image (which is also referred to as an image) is obtained by analyzing the association information of the target object.

Figure 7A:
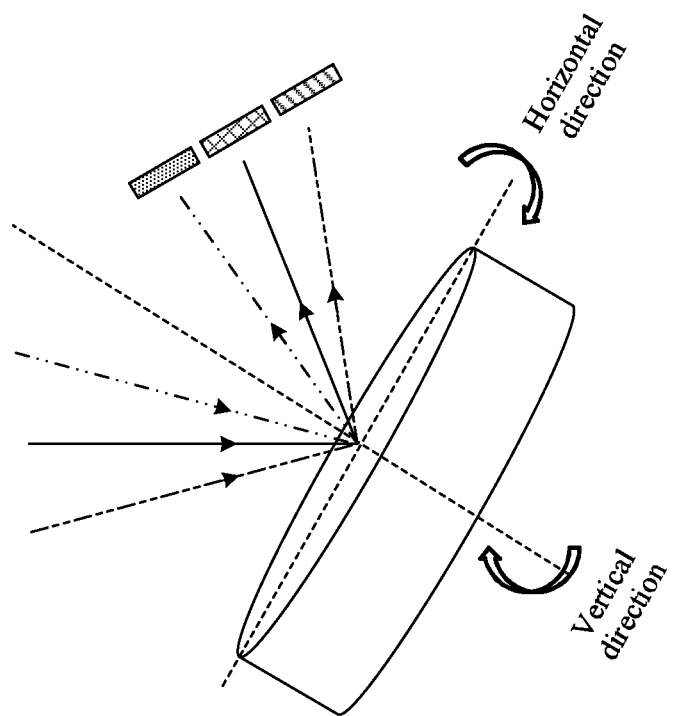
FIG. 7a is a schematic structural diagram of a scanner according to this application.
Figure 7B:
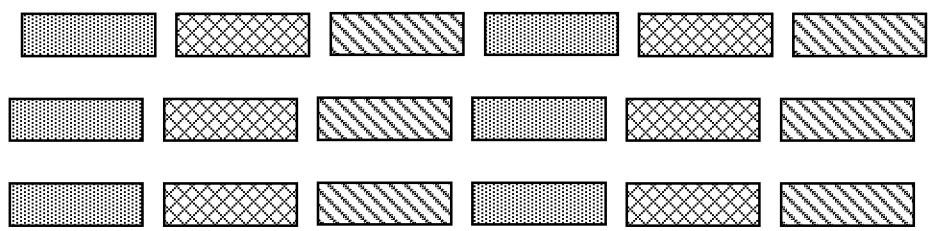
FIG. 7b is a schematic diagram of a two-dimensional scanning track of a plurality of beams according to this application.

FIG. 7a is a schematic structural diagram of a scanner according to this application. The scanner may change the detection angle in a two-dimensional direction (a horizontal direction and a vertical direction), that is, rotate at different detection angles. In FIG. 7a, three second laser beams are used as an example for description. At a detection angle, the three second laser beams are emitted to the detection area by using the scanner, to obtain three scanning points. In FIG. 7a, different filled patterns are used to represent different scanning points. A schematic diagram of a two-dimensional scanning track of a plurality of beams shown in FIG. 7b may be obtained by continuously emitting the three second laser beams to the detection area at continuously changing detection angles. The scanning track may be obtained by the processing control module by controlling the scanner to perform scanning in a preset scanning manner. It may also be understood as that the processing control module controls the scanner to rotate in the two-dimensional direction, so that the scanner performs scanning at different detection angles to obtain the scanning track. For example, the processing control module may control the scanning module to first rotate in the horizontal direction and then rotate in the vertical direction, or first rotate in the vertical direction and then rotate in the horizontal direction, or rotate both in the vertical direction and the horizontal direction, or rotate alternately in the horizontal direction and the vertical direction.

Figure 7C:
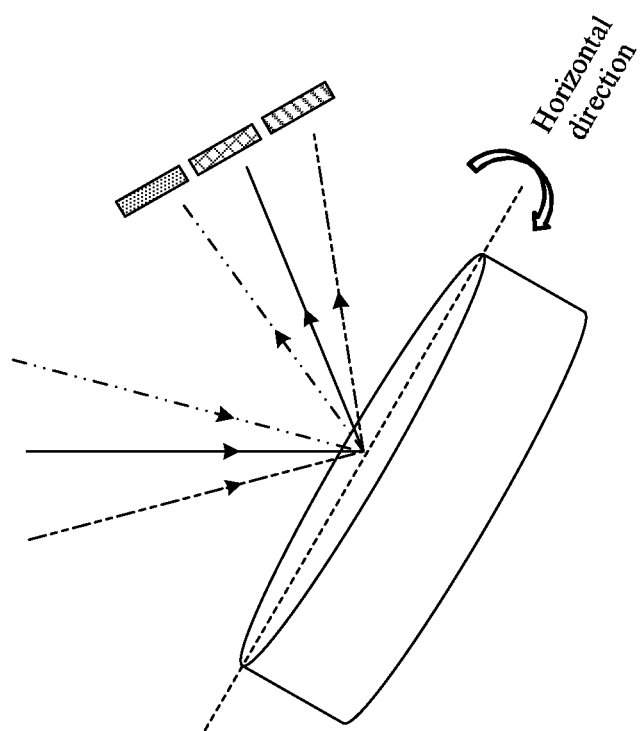
FIG. 7c is a schematic structural diagram of another scanner according to this application.
Figure 7D:
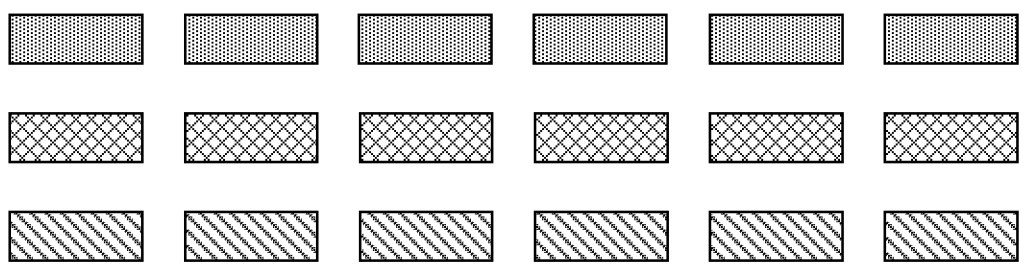
FIG. 7d is a schematic diagram of another two-dimensional scanning track of a plurality of beams according to this application.

FIG. 7c is a schematic structural diagram of another scanner according to this application. The scanner may change the detection angle in a one-dimensional direction (a horizontal direction), so that the scanner is enabled to be at different detection angles. In FIG. 7c, three second laser beams are used as an example for description. At a detection angle, the three second laser beams are emitted to the detection area by using the scanner, to obtain three scanning points. In FIG. 7c, different filled patterns are used to represent different scanning points. After a plurality of scans, a schematic diagram of a two-dimensional scanning track of a plurality of beams as shown in FIG. 7d is obtained. It may also be understood that the scanner reflects the three emitted second laser beams to the detection area, scanning points of the second laser beams present one-dimensional distribution, and one-dimensional scanning is performed on the plurality of second laser beams, to form the two-dimensional scanning track of the plurality of beams shown in FIG. 7d. A one-dimensional scanner can decrease a volume of the laser radar and simplify control performed by the processing control module.

It should be noted that, when the scanner is a scanner that rotates in the one-dimensional direction (the horizontal direction), during assembling and commissioning of the scanner, a rotation shaft of the one-dimensional scanner may be located on an incident plane on which the N second laser beams are located. The one-dimensional scanner is only responsible for scanning the N second laser beams in one dimension (the horizontal dimension shown in FIG. 7c). In the horizontal dimension, the processing control module may control the angular resolution, and the angular resolution in the vertical dimension is an included angle between two adjacent second laser beams. It may also be understood that the angular resolution in the vertical dimension may be determined by the included angle adjustment module.

In a possible implementation, functions of the included angle adjustment module and the scanning module may also be implemented by using the OPA. A working principle of the OPA is as follows: A phase relationship between optical waves radiated from phase control units (such as an optical phase shifter) is adjusted, so that the optical waves are in a same phase in a specific direction, and mutually-reinforcing interference is generated. As a result, a high-intensity beam in the direction is generated. However, the optical waves that are radiated from the phase control units and that are in another direction are not in a same phase. Therefore, the optical waves that are radiated from the phase control units and that are in another direction are canceled, and radiation intensity is close to 0. Under control of the processing and control module, the phase control units included in the phased array can specify a direction/directions of one or more high-intensity laser beams based on a designed program, to implement scanning.

In this application, the OPA may receive N second laser beams from the N first beam splitting modules, adjust an included angle between any two adjacent second laser beams in the N second laser beams to be greater than 0 degrees and not greater than an angular resolution of the laser radar, and respectively emit the N second laser beams in which an included angle between any two adjacent second laser beams is greater than 0 degrees and not greater than the angular resolution of the laser radar to the detection area at different detection angles.

In a possible implementation, the N second laser beams are emitted to the OPA, and the OPA performs phase modulation on wavefronts of the N second laser beams, so that an included angle between any two adjacent second laser beams in the N second laser beams is greater than 0 degrees and not greater than the angular resolution of the laser radar. In addition, the N second laser beams scan a same viewing field. It may also be understood that the N second laser beams that do not overlap with each other scan a same viewing field. The OPA performs two-dimensional scanning to obtain the scanning track shown in FIG. 7b, and performs one-dimensional scanning to obtain the scanning track shown in FIG. 7d.

5. Optical Splitting Module

After an $i^{th}$ second laser beam in the N second laser beams is emitted to the target object in the detection area, an $i^{th}$ echo signal is reflected. The $i^{th}$ echo signal needs to be transmitted to an $i^{th}$ detection module, where i is any integer from 1 to N. In a possible implementation, the laser radar further includes N optical splitting modules, and the N optical splitting modules and N echo optical signals are in a one-to-one correspondence. For each of the N optical splitting modules, each optical splitting module is configured to transmit the received echo signal to the corresponding detection module. It may also be understood that a $k^{th}$ optical splitting module in the N optical splitting modules is configured to transmit a $k^{th}$ echo signal to a $k^{th}$ detection module, where k ranges from 1 to N.

The optical splitting module may be a reflection mirror with a through hole, a PBS, or an optical fiber circulator. When the optical splitting module is a reflection mirror with a through hole, a hole of the reflection mirror with a through hole may enable the second laser beam to be transparently transmitted to the included angle adjustment module, and a reflective surface of the reflection mirror with a through hole may reflect the echo signal to the corresponding detection module. When the optical splitting module is a PBS, the second laser beam is transparently transmitted to the included angle adjustment module from the PBS, and the echo signal is reflected to the corresponding detection module. When the optical splitting module is an optical fiber circulator, the second laser beam may be transmitted to the included angle adjustment module from a port, and the echo signal is reflected to the corresponding detection module from another port. It may also be understood that the $k^{th}$ optical splitting module is configured to transmit the $k^{th}$ echo signal to the $k^{th}$ detection module, and the $k^{th}$ optical splitting module does not affect an original optical path of a $k^{th}$ second laser beam, where k ranges from 1 to N.

It should be noted that, before the $k^{th}$ echo signal is transmitted to the detection module by using the optical splitting module, the $k^{th}$ echo signal and the corresponding $k^{th}$ second laser beam are collinear, which is also referred to as coaxial.

6. Processing Control Module

In a possible implementation, when the modulator in the laser radar modulates the N laser beams, the processing control module is further configured to control synchronization between the scanner and the modulator. When the modulator in the laser radar modulates the N laser beams by changing a wavelength, the processing control module is further configured to control synchronization between the scanner and the laser. To be specific, the processing control module may control the scanning module to be at different detection angles, and may further be configured to control synchronization between the scanning module and the modulator, or control synchronization between the scanning module and the laser.

Further, when the modulator in the laser radar modulates the N laser beams, the processing control module may further control synchronization between the scanning module, the modulator, and the detection module. When the laser in the laser radar modulates the N laser beams through wavelength tuning, the processing control module is further configured to control synchronization between the scanning module, the laser, and the detection module.

It should be noted that, in this application, synchronization between the laser and the scanning module means synchronization between frequency modulation of the laser and scanning module. Synchronization between the laser, the detection module, and the scanning module is synchronization between the frequency modulation of the laser, the detection module, and the scanning module.

For example, the processing control module may first control the scanning module to emit the N second laser beams to the detection area at a detection angle, and trigger the modulator (or the laser) to perform frequency modulation on the N laser beams in a frequency modulation period (for a detailed process, refer to the foregoing description). After the frequency modulation period ends, the modulator (or the laser) stops modulation. N second laser beams that are obtained through frequency modulation are emitted by the scanning module to the detection area, and echo signals are reflected after the N second laser beams meet the target object, and are transmitted to corresponding detection modules by using respective corresponding optical splitting modules. The processing control module triggers the data collection unit in the detection module to collect a beat frequency signal obtained after frequency mixing is performed on the echo signal and the first laser beam. Then, the processing control module obtains association information of the target object based on the beat frequency signal, and processes the association information of the target object, to obtain an image. Then, the processing control module controls the scanning module to be at another detection angle, and repeats the foregoing process.

It should be noted that, during the processing control module controls synchronization between the detection module and the modulator or synchronization between the detection module and the frequency modulation of the laser, the signal receiving unit in the detection module may always receive the first laser beam and the corresponding echo signal.

In a possible implementation, the processing control module may include a processing unit and a control unit. The processing unit may be a general-purpose processor, a field programmable gate array (FPGA), a digital signal processing (DSP) circuit, an application-specific integrated circuit (ASIC), or another programmable logic device. The control unit includes a drive of the scanner, a drive of the modulator, a drive of the frequency modulation of the laser, a drive of the detector, and the like. The drives may be integrated together, or may be separated.

Optionally, the FPGA may send a control signal to each drive of the control unit, so that the drive of the scanner controls the scanning module, the drive of the modulator controls the modulator, and the drive of the detector controls the detection module, to implement synchronization between the scanning module, the detection module, and the modulator. Alternatively, the drive of the scanner controls the scanning module, the drive of the frequency modulation of the laser controls the frequency modulation of the laser, and the drive of the detector controls the detection module, to implement synchronization between the scanning module, the detection module, and the frequency modulation of the laser. The scanner is used as an example. The FPGA may send a control signal to the drive of the scanning module, and the drive of the scanning module may control, based on the control signal, the scanner to be at a detection angle.

Figure 8A:
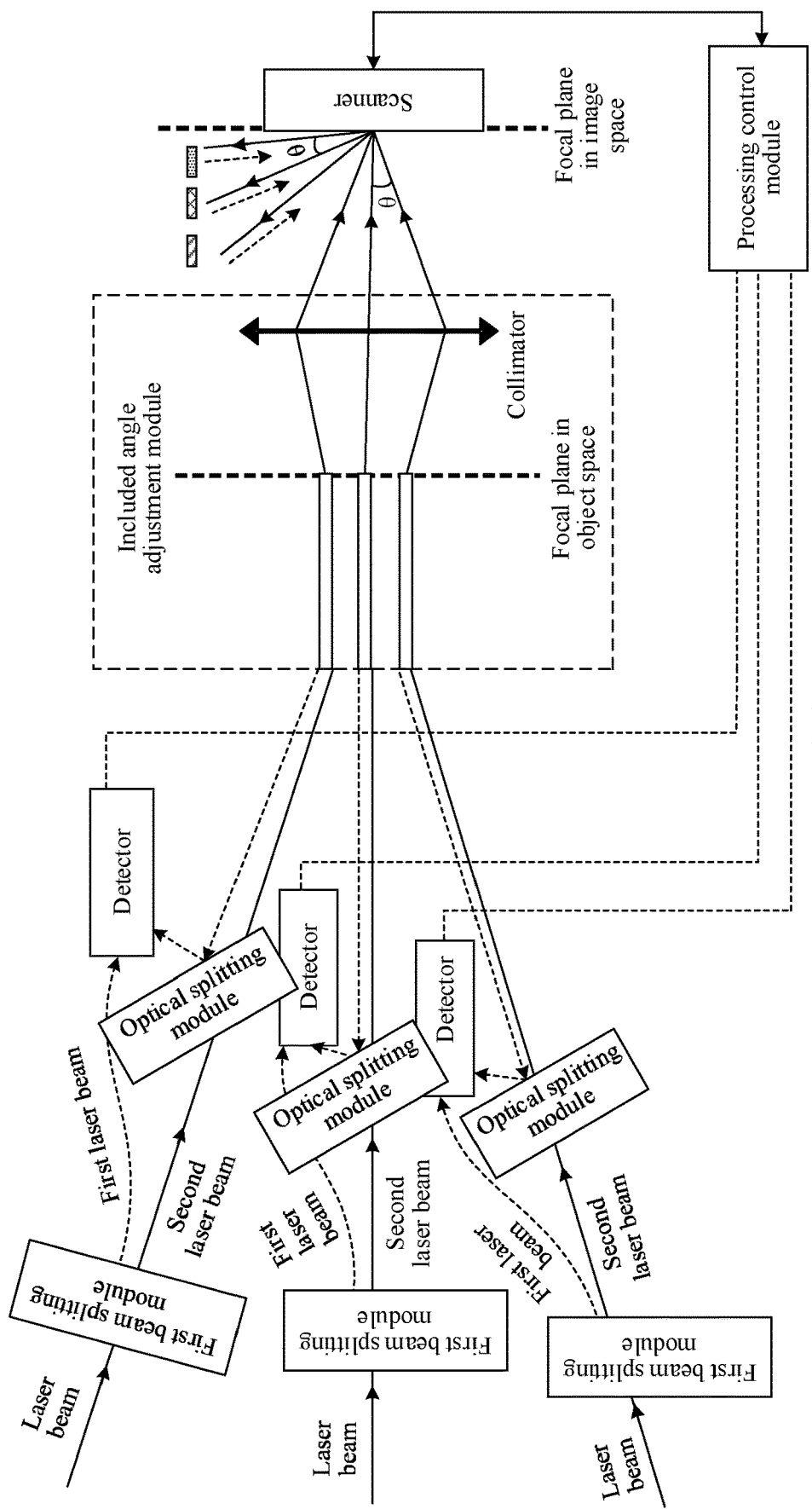
FIG. 8a is a schematic structural diagram of a laser radar according to this application.

In this application, the laser beam in the laser radar may be transmitted in space, or may be transmitted through an optical fiber. FIG. 8a is a schematic structural diagram of another laser radar according to this application. A beam of the laser radar is transmitted in space. The laser radar includes a laser, N first beam splitting modules, an included angle adjustment module, N detectors, a scanner, a processing control module, and N optical splitting modules. The N first beam splitting modules, the N detectors, and the N optical splitting modules are in a one-to-one correspondence. The included angle adjustment module is a combination of an optical fiber array and a collimator. For details, refer to the foregoing description in FIG. 6. Details are not described herein again. The optical splitting module may be a reflection mirror with a through hole or a PBS. The scanner is a reflective scanner. For details, refer to the description in FIG. 7a or FIG. 7c. Details are not described herein again. For the laser, the N first beam splitting modules, the N detectors, and the processing control module, refer to the description in the foregoing corresponding content. Details are not described herein again.

Figure 8B:
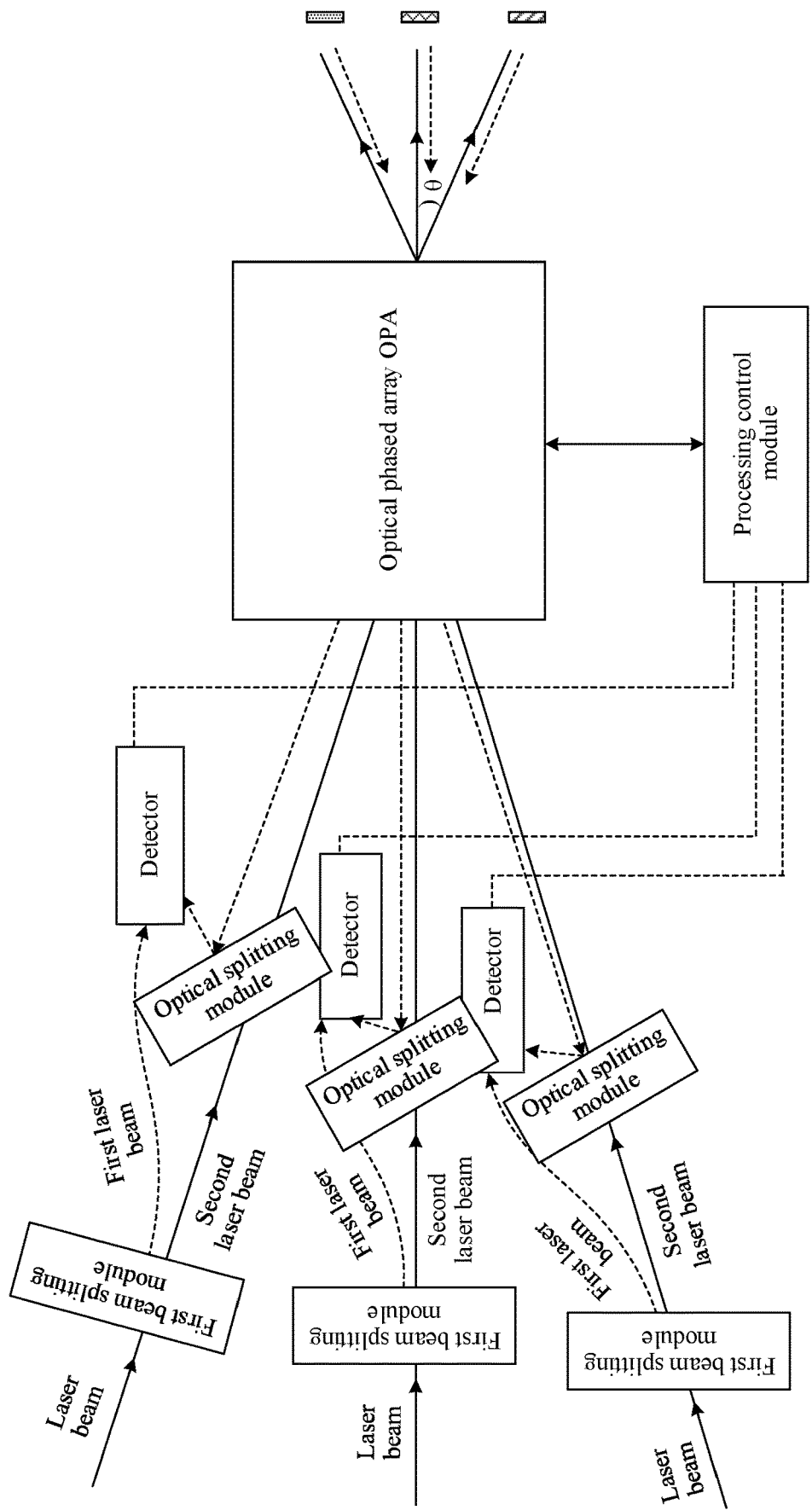
FIG. 8b is a schematic structural diagram of another laser radar according to this application.

FIG. 8b is a schematic structural diagram of another laser radar according to this application. A beam of the laser radar is transmitted in space. The laser radar includes a laser, N first beam splitting modules, N detectors, an OPA, a processing control module, and N optical splitting modules. The N first beam splitting modules, the N detectors, and the N optical splitting modules are in a one-to-one correspondence. A difference from FIG. 8a is that functions of the included angle adjustment module and the scanner are implemented by the OPA. For detailed description of the OPA, refer to the foregoing content. Details are not described herein again.

Figure 8C:
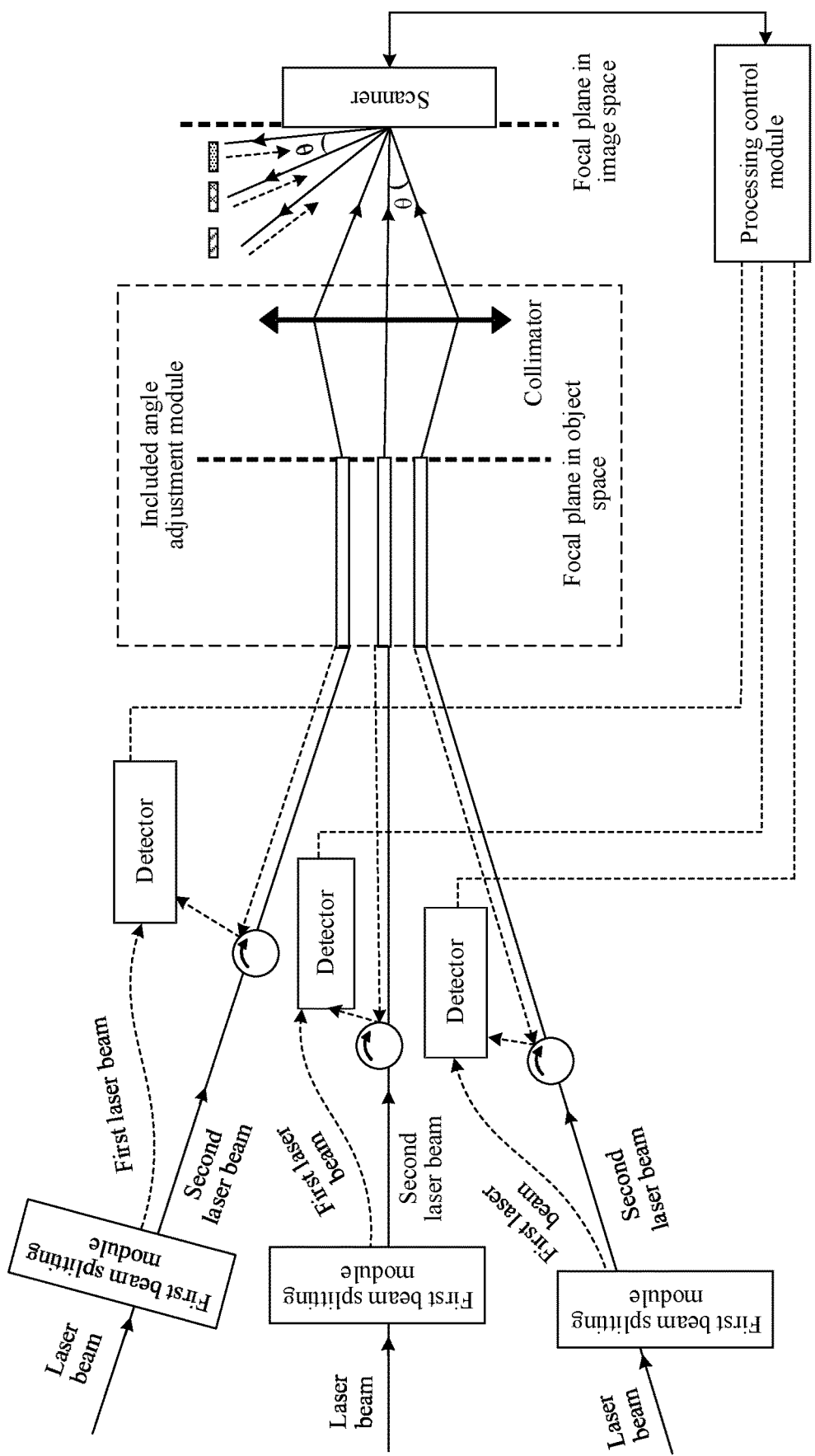
FIG. 8c is a schematic structural diagram of still another laser radar according to this application.

FIG. 8c is a schematic structural diagram of still another laser radar according to this application. A beam of the laser radar is transmitted through an optical fiber. The laser radar includes a laser, N first beam splitting modules, an included angle adjustment module, N detectors, a scanner, a processing control module, and N optical splitting modules. The N first beam splitting modules, the N detectors, and the N optical splitting modules are in a one-to-one correspondence. A difference between the laser radar in FIG. 8c and the laser radar in FIG. 8a is that in FIG. 8c, the optical splitting module is an optical fiber circulator, the laser is connected to the N first beam splitting modules through optical fibers, the N first beam splitting modules are connected to the N optical fiber circulators through optical fibers, and the N fiber circulators are connected to the included angle adjustment module through optical fibers. For description of other parts, refer to the description in FIG. 8a. Details are not described herein again.

Based on the laser radar shown in FIG. 8c, the laser radar uses an optical fiber architecture. After the laser beam is emitted by the laser, the laser beam may sequentially enter the first beam splitting module, the optical fiber circulator, the included angle adjustment module, and the scanner along an optical fiber channel. In this way, an optical path commissioning process of the laser radar can be simplified, so that an installation process is relatively simple.

In any one of the foregoing embodiments, all laser beams obtained after the N laser beams are modulated based on the first preset condition may be frequency-modulated continuous waves FMCWs. The FMCW measures association information of a target object according to a coherent detection principle. Usually, a frequency difference between an external interference beam and an intrinsic beam is relatively large. Therefore, it is difficult for the external interference beam to be coherently mixed with the intrinsic beam, to generate a beat frequency signal. Therefore, that the laser beam is an FMCW helps improve an anti-interference ability of the laser radar.

Further, when the laser beam is an FMCW, a motion speed of the target object relative to the laser radar may further be measured by using a Doppler effect. This helps extend an application scenario of the laser radar.

Figure 9:
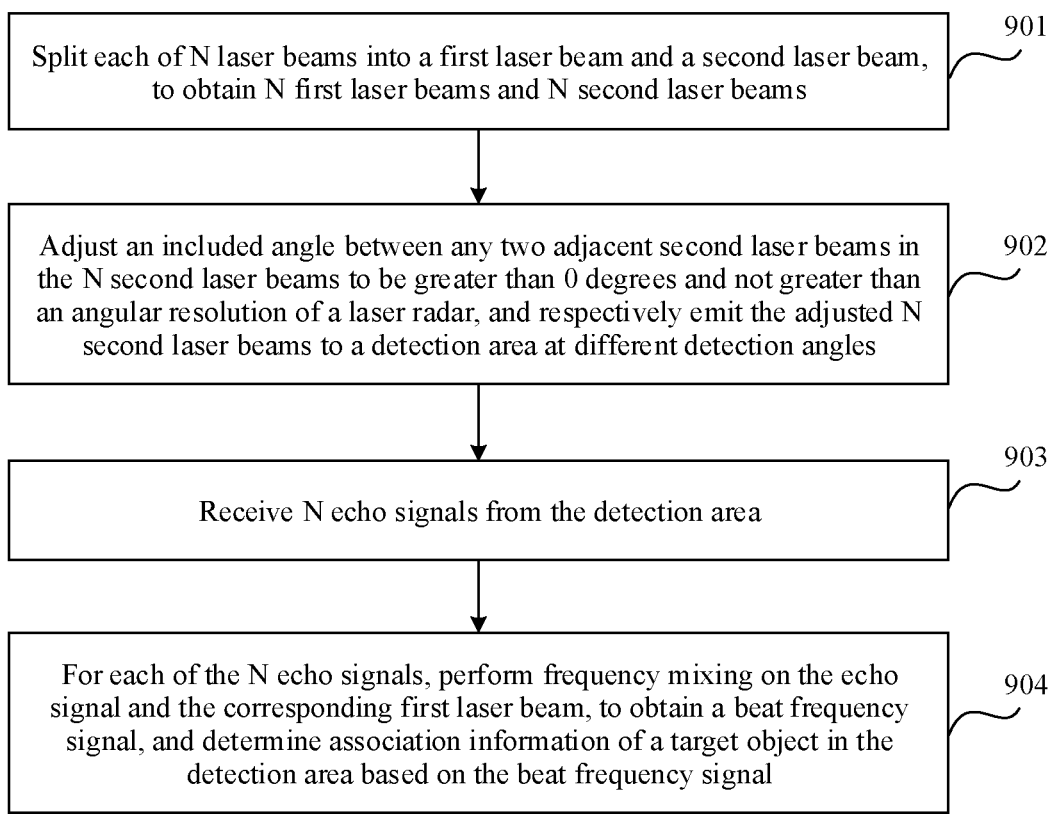
FIG. 9 is a schematic flowchart of a laser radar detection method according to this application.

Based on the foregoing content and a same concept, this application provides a laser radar detection method shown in FIG. 9. The laser radar detection method may be applied to the laser radar in any one of the foregoing embodiments. As shown in FIG. 9, the method includes the following steps.

Step 901: Split each of N laser beams into a first laser beam and a second laser beam, to obtain N first laser beams and N second laser beams.

N is an integer greater than 1, and the N laser beams may be N laser beams emitted by a laser in a laser radar. For a detailed process in which the laser emits the N laser beams, refer to the foregoing description of the laser. Details are not described herein again. In addition, a first beam splitting module may split the laser beam into the first laser beam and the second laser beam. For a specific process, refer to the description of the first beam splitting module in the foregoing embodiment. Details are not described herein again.

One first laser beam corresponds to one second laser beam, that is, the N first laser beams and the N second laser beams are in a one-to-one correspondence.

Step 902: Adjust an included angle between any two adjacent second laser beams in the N second laser beams to be greater than 0 degrees and not greater than an angular resolution of the laser radar, and respectively emit the adjusted N second laser beams to a detection area at different detection angles.

The angular resolution of the laser radar may also be referred to as a scanning resolution of the laser radar, and is a preset included angle between adjacent laser beams that are emitted to the detection area, or is an expected included angle between adjacent laser beams that are emitted to the detection area.

In this application, the included angle between any two adjacent second laser beams in the N second laser beams may be adjusted by using a structure of a combination of an optical fiber array and a collimator, or in a manner of an OPA, or by using a combination of reflection mirrors. Adjustment manners are not listed one by one herein. For the structure of the combination of the optical fiber array and the collimator, and an implementation in which the OPA adjusts the included angle between any two adjacent second laser beams, refer to the foregoing description of the included angle adjustment module. Details are not described herein again.

In step 902, a processing control module may control a detection module to emit the adjusted N second laser beams to the detection area at different detection angles, and control a scanning module to perform scanning in the detection area. For a specific process, refer to the foregoing description of the detection module, the scanning module, and the processing control module. Details are not described herein again.

Step 903: Receive N echo signals from the detection area.

After the second laser beam is emitted to the detection area, the echo signal is reflected by a target object. One second laser beam corresponds to one echo signal. The N second laser beams are emitted to the detection area, and the N echo signals may be reflected, where the N echo signals and the N second laser beams that are emitted to the detection area are in a one-to-one correspondence.

Step 904: For each of the N echo signals, perform frequency mixing on the echo signal and the corresponding first laser beam, to obtain N beat frequency signals, and determine association information of the target object in the detection area based on the beat frequency signal.

An $i^{th}$ laser beam is used as an example. The $i^{th}$ laser beam may be any one of the N laser beams, and the $i^{th}$ laser beam may be split into an $i^{th}$ first laser beam and an $i^{th}$ second laser beam. After the $i^{th}$ second laser beam is emitted to the detection area, an $i^{th}$ echo signal may be reflected, and frequency mixing may be performed on the $i^{th}$ first laser beam and the $i^{th}$ echo signal, to obtain a beat frequency signal.

It can be seen from step 901 to step 904, an included angle between any two adjacent second laser beams in the N second laser beams is adjusted to be greater than 0 degrees and not greater than the angular resolution of the laser radar, that is, the second laser beams alternately scan the detection area. The scanning module emits the N second laser beams to the detection area for detection at each detection angle, and receives the N reflected echo signals. Association information of one target object may be determined based on one echo signal and one first laser beam, and N pieces of association information may be determined based on the N echo signals and the corresponding N first laser beams. In other words, a relatively large amount of association information is obtained in one detection process by using the laser radar in this application. Because the association information of the target object may be used to form an image, point cloud density that is determined based on the relatively large amount of association information is relatively high, and a definition of the formed image is also relatively high.

Because an included angle between any two adjacent second laser beams in the N second laser beams is relatively small, an echo signal of one second laser beam may be emitted to the detection module corresponding to another second laser beam. This causes crosstalk between two echo signals. To avoid crosstalk between the echo signals as much as possible, in this application, the N laser beams may be modulated. For example, the N laser beams may be modulated based on a first preset condition, where the first preset condition is that two laser beams whose included angle is less than a preset angle use different frequency modulation rates. For a specific modulation process, refer to the foregoing description of Implementation 1 and Implementation 2 in the detection module. Details are not described herein again.

Further, optionally, all laser beams obtained after the N laser beams are modulated based on the first preset condition are frequency-modulated continuous waves FMCWs. In this way, a motion speed of the target object relative to the laser radar may be measured by using a Doppler effect. This helps extend an application scenario of the laser radar.

Although this application is described with reference to specific features and the embodiments thereof, it is clear that various modifications and combinations may be made to this application without departing from the spirit and scope of this application. Correspondingly, the specification and the accompanying drawings are merely example description of the solution defined by the appended claims, and are intended to cover any of or all modifications, variations, combinations or equivalents within the scope of this application.

It is clear that a person skilled in the art can make various modifications and variations to this application without departing from the spirit and the scope of this application. The embodiments of this application is intended to cover these modifications and variations provided that they fall within the scope of protection defined by the following claims and their equivalent technologies.

What is claimed is:

1. A laser radar, comprising multiple lasers, N first beam splitters, an included angle adjustment module, N detection modules, a scanner, and a processor, wherein the N first beam splitters and the N detection modules are in a one-to-one correspondence;
    the multiple lasers are configured to: emit N laser beams, and transmit the N laser beams to the N first beam splitters, wherein the N laser beams and the N first beam splitters are in a one-to-one correspondence, and N is an integer greater than 1;
    for each of the N first beam splitters, each first beam splitter is configured to split the received laser beam into a first laser beam and a second laser beam, to obtain N first laser beams and N second laser beams;
    the included angle adjustment module is configured to: receive the N second laser beams from the N first beam splitters, and adjust an included angle between any two adjacent second laser beams in the N second laser beams to be greater than 0 degrees and not greater than an angular resolution of the laser radar;
    the scanner is configured to: receive the N second laser beams from the included angle adjustment module, and emit each of the N second laser beams to a detection area at different detection angles;
    for each of the N detection modules, the detection module is configured to: receive the corresponding first laser beam from the corresponding first beam splitters, receive a corresponding echo signal, perform frequency mixing on the received first laser beam and the received echo signal to obtain a beat frequency signal, and determine association information of a target object in the detection area based on the beat frequency signal, wherein the corresponding echo signal is a reflection of the second laser beam from the corresponding first beam splitters in the detection area; and
    the processor is configured to control the scanner to be at different detection angles.

2. The laser radar according to claim 1, wherein the laser radar further comprises a modulator; and
    the modulator is configured to modulate the N laser beams from the laser based on a first preset condition, wherein the first preset condition is that two laser beams whose included angle is less than a preset angle use different frequency modulation rates.

3. The laser radar according to claim 2, wherein all obtained laser beams are frequency-modulated continuous waves (FMCWs).

4. The laser radar according to claim 2, wherein the processor is further configured to control synchronization between the scanner and the modulator.

5. The laser radar according to claim 1, wherein the multiple lasers are further configured to:
    modulate the N laser beams based on a first preset condition, wherein
    the first preset condition is that two laser beams whose included angle is less than a preset angle use different frequency modulation rates.

6. The laser radar according to claim 5, wherein the processor is further configured to control synchronization between the scanner and the laser.

7. The laser radar according to claim 1, wherein the included angle adjustment module comprises N optical fibers and a collimator, and the N optical fibers and the N second laser beams are in a one-to-one correspondence;
    for each of the N optical fibers, the optical fiber is configured to: receive the second laser beam from the corresponding first beam splitter, and transmit the received second laser beam to the collimator; and
    the collimator is configured to: receive the N second laser beams from the N optical fibers, and collimate the N second laser beams, to obtain the N second laser beams in which an included angle between any two adjacent second laser beams is greater than 0 degrees and not greater than the angular resolution of the laser radar.

8. The laser radar according to claim 7, wherein beam outlets of the N optical fibers are located on a focal plane in an object space of the collimator.

9. The laser radar according to claim 7, wherein the scanner is located on a focal plane in an image space of the collimator.

10. The laser radar according to claim 1, wherein the laser radar further comprises N optical splitting modules, wherein the N optical splitting modules and the N echo signals are in a one-to-one correspondence, and the N optical splitting modules and the N detection modules are in a one-to-one correspondence; and for each of the N optical splitting modules, the optical splitting module is configured to direct the received echo signal to the corresponding detection module.

11. The laser radar according to claim 10, wherein for each of the N optical splitting modules, the optical splitting module is an optical fiber circulator, and the optical fiber circulator is located between the corresponding first beam splitter and the included angle adjustment module; and the laser is connected to the N first beam splitter through optical fibers, the N first beam splitter are connected to the N optical fiber circulators through optical fibers, and the N fiber circulators are connected to the included angle adjustment module through optical fibers.

12. A laser radar detection method, comprising:

splitting each of N laser beams into a first laser beam and a second laser beam, to obtain N first laser beams and N second laser beams, wherein N is an integer greater than 1;

adjusting an included angle between any two adjacent second laser beams in the N second laser beams to be greater than 0 degrees and not greater than an angular resolution of the laser radar to obtain adjusted N second laser beams, and respectively emitting the adjusted N second laser beams to a detection area at different detection angles;

receiving N echo signals from the detection area, wherein the N echo signals and the N second laser beams emitted to the detection area are in a one-to-one correspondence; and for each of the N echo signals, performing frequency mixing on the echo signal and the corresponding first laser beam, to obtain a beat frequency signal, and determining association information of a target object in the detection area based on the beat frequency signal.

13. The method according to claim 12, wherein the method further comprises:

modulating the N laser beams based on a first preset condition, wherein the first preset condition is that two laser beams whose included angle is less than a preset angle use different frequency modulation rates.

14. The method according to claim 13, wherein the N laser beams are modulated based on the first preset condition, and all obtained first laser beams are frequency-modulated continuous waves (FMCWs).

15. A computer-readable storage medium, wherein the computer-readable storage medium stores a computer program or instructions, and when the computer program or the instructions is/are executed by a laser radar, the laser radar is configured to perform a method comprising:

splitting each of N laser beams into a first laser beam and a second laser beam, to obtain N first laser beams and N second laser beams, wherein N is an integer greater than 1;

adjusting an included angle between any two adjacent second laser beams in the N second laser beams to be greater than 0 degrees and not greater than an angular resolution of the laser radar to obtain adjusted N second laser beams, and respectively emitting the adjusted N second laser beams to a detection area at different detection angles;

receiving N echo signals from the detection area, wherein the N echo signals and the N second laser beams emitted to the detection area are in a one-to-one correspondence; and for each of the N echo signals, performing frequency mixing on the echo signal and the corresponding first laser beam, to obtain a beat frequency signal, and determining association information of a target object in the detection area based on the beat frequency signal.

16. The computer-readable storage medium according to claim 15, wherein the method further comprises:

modulating the N laser beams based on a first preset condition, wherein the first preset condition is that two laser beams whose included angle is less than a preset angle use different frequency modulation rates.

17. The computer-readable storage medium according to claim 16, wherein the N laser beams are modulated based on the first preset condition, and all obtained first laser beams are frequency-modulated continuous waves (FMCWs).

* * * * *